(12) United States Patent
Tsunoda et al.

(10) Patent No.: US 9,342,356 B2
(45) Date of Patent: May 17, 2016

(54) TASK EXECUTION CONTROL FOR GENERATING CONTEXT INFORMATION OF A USER TO LOCATE AVAILABLE SERVICES

(71) Applicant: FUJITSU LIMITED, Kawasaki-shi, Kanagawa (JP)

(72) Inventors: Tadanobu Tsunoda, Yokohama (JP); Kazumasa Ushiki, Kawasaki (JP); Nobutsugu Fujino, Yokohama (JP); Naoki Hasegawa, Kawasaki (JP); Yoshiaki Kawakatsu, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 256 days.

(21) Appl. No.: 14/041,551

(22) Filed: Sep. 30, 2013

(65) Prior Publication Data

US 2014/0040905 A1  Feb. 6, 2014

Related U.S. Application Data

(63) Continuation of application No. PCT/JP2011/058144, filed on Mar. 30, 2011.

(51) Int. Cl.
G06F 9/48 (2006.01)
G06Q 10/06 (2012.01)
G06F 9/46 (2006.01)

(52) U.S. Cl.
CPC ........ *G06F 9/4881* (2013.01); *G06Q 10/06311* (2013.01)

(58) Field of Classification Search
None
See application file for complete search history.

(56) References Cited

U.S. PATENT DOCUMENTS

| 5,560,011 A * | 9/1996 | Uyama ........................ 718/107 |
| 2002/0169752 A1 | 11/2002 | Kusama et al. |
| 2006/0156252 A1 | 7/2006 | Sheshagiri et al. |
| 2007/0176786 A1 | 8/2007 | Yamamoto |

FOREIGN PATENT DOCUMENTS

| JP | 2003-30389 | 1/2003 |
| JP | 2004-348495 | 12/2004 |
| JP | 2006-228198 | 8/2006 |

(Continued)

OTHER PUBLICATIONS

Japanese Office Action dated Sep. 9, 2014 in corresponding Japanese Patent Application No. 2013-506962.

(Continued)

*Primary Examiner* — Eric C Wai
(74) *Attorney, Agent, or Firm* — Staas & Halsey LLP

(57) ABSTRACT

A task execution controller includes a context generating unit that generates context information concerning a user and a surrounding situation of the user; a task managing unit that stores multiple tasks the user attempts to execute, selects a task according to the context information and a predetermined task selection rule, and controls execution of the task; and a service managing unit that confirms services executed by a device used for execution of the task, gives notification of a service corresponding to the execution of the task selected by the task managing unit, to the device and causes the device to perform the service. The task managing unit selects a task by using, as the task selection rule, information of priority levels of tasks and an execution-related dependency relation between tasks preset among the tasks.

13 Claims, 36 Drawing Sheets

(56) References Cited

FOREIGN PATENT DOCUMENTS

| | | |
|---|---|---|
| JP | 2007-164519 | 6/2007 |
| JP | 2008-15585 | 1/2008 |
| JP | 2008-33618 | 2/2008 |
| JP | 2008-97297 | 4/2008 |
| JP | 2008-282068 | 11/2008 |
| JP | 2010-113621 | 5/2010 |
| WO | WO 2006/003817 | 1/2006 |

OTHER PUBLICATIONS

PCT International Preliminary Report on Patentability mailed Oct. 10, 2013 in corresponding International Application No. PCT/JP2011/058144.
International Search Report mailed May 31, 2011 in corresponding International Application No. PCT/JP2011/058144.

* cited by examiner

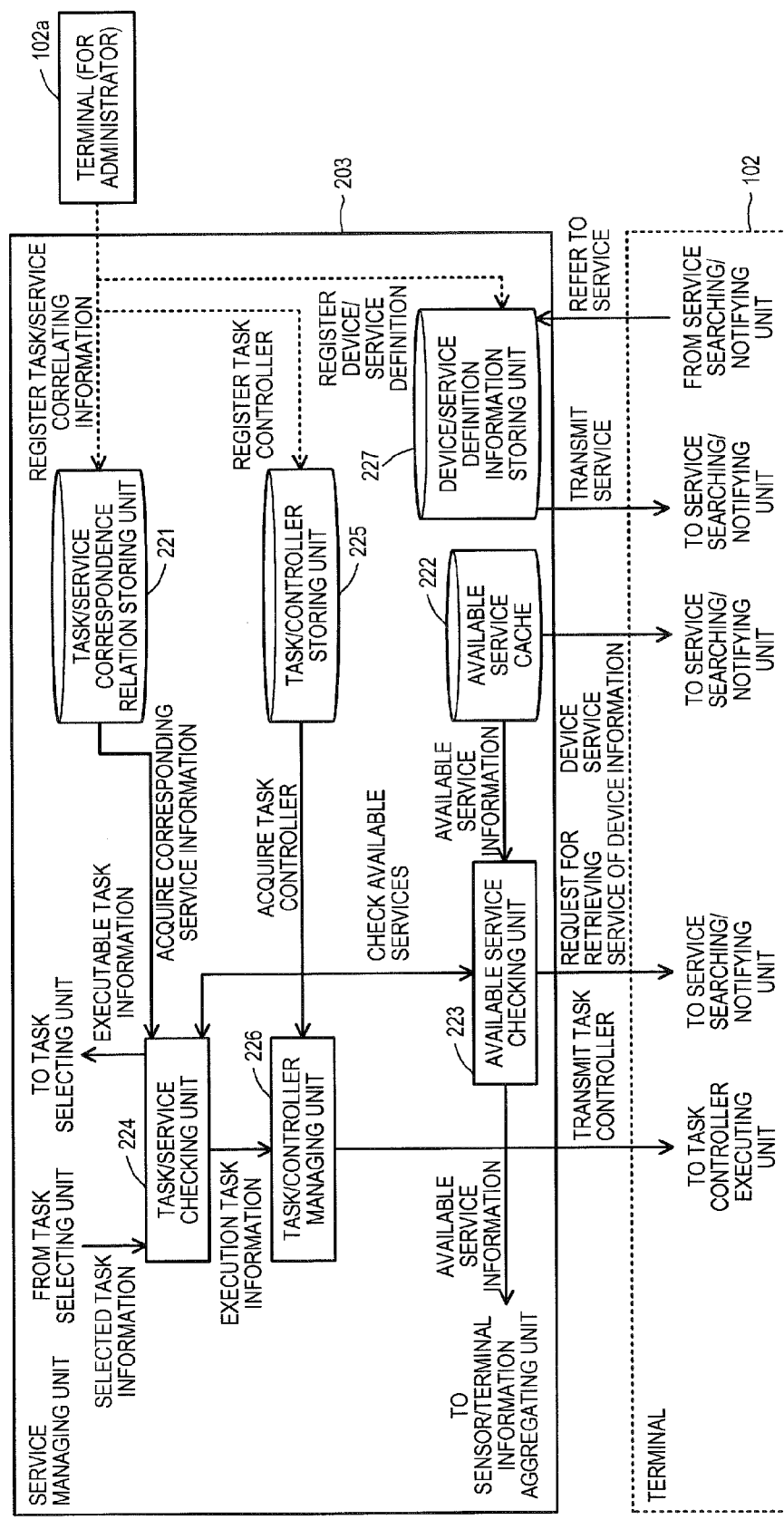

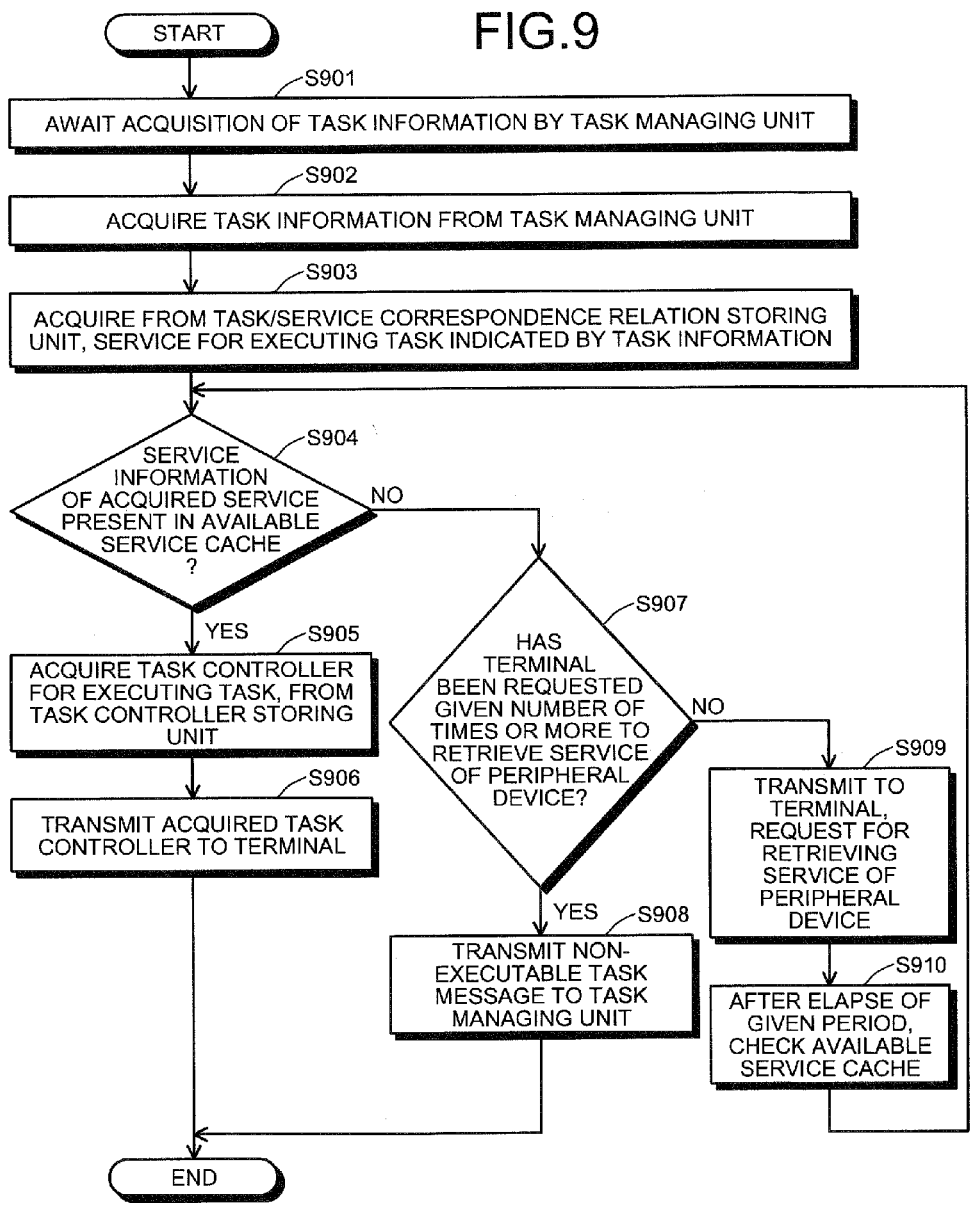

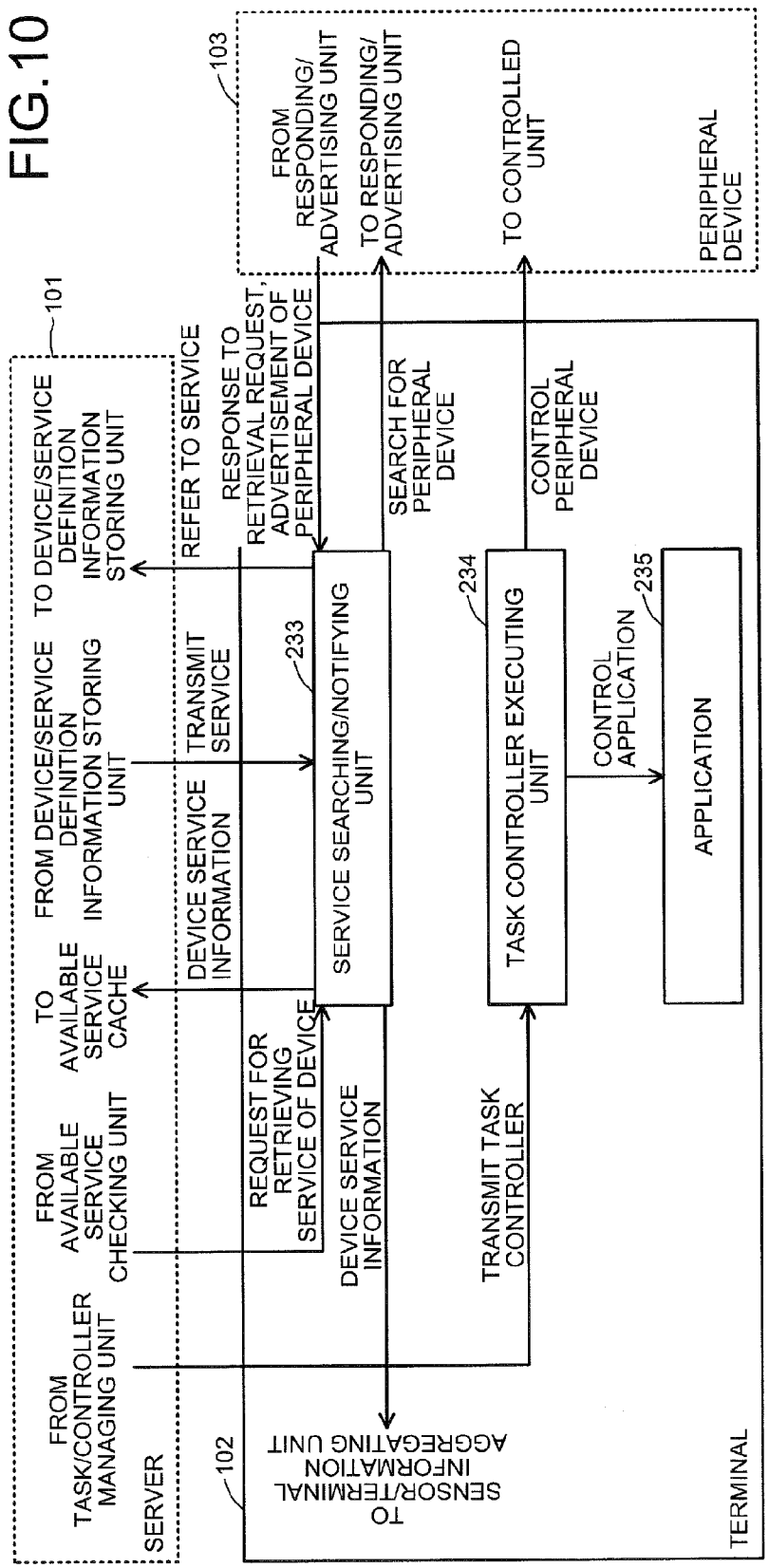

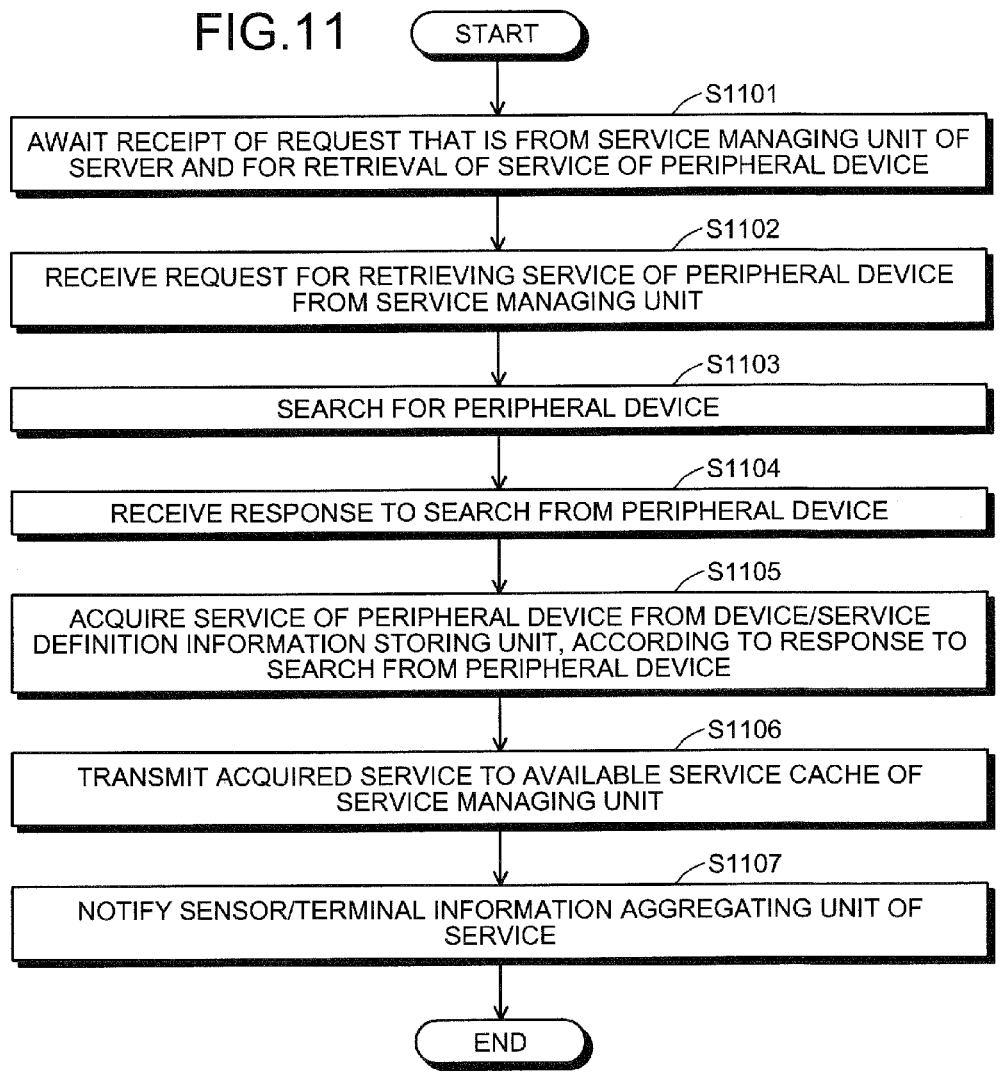

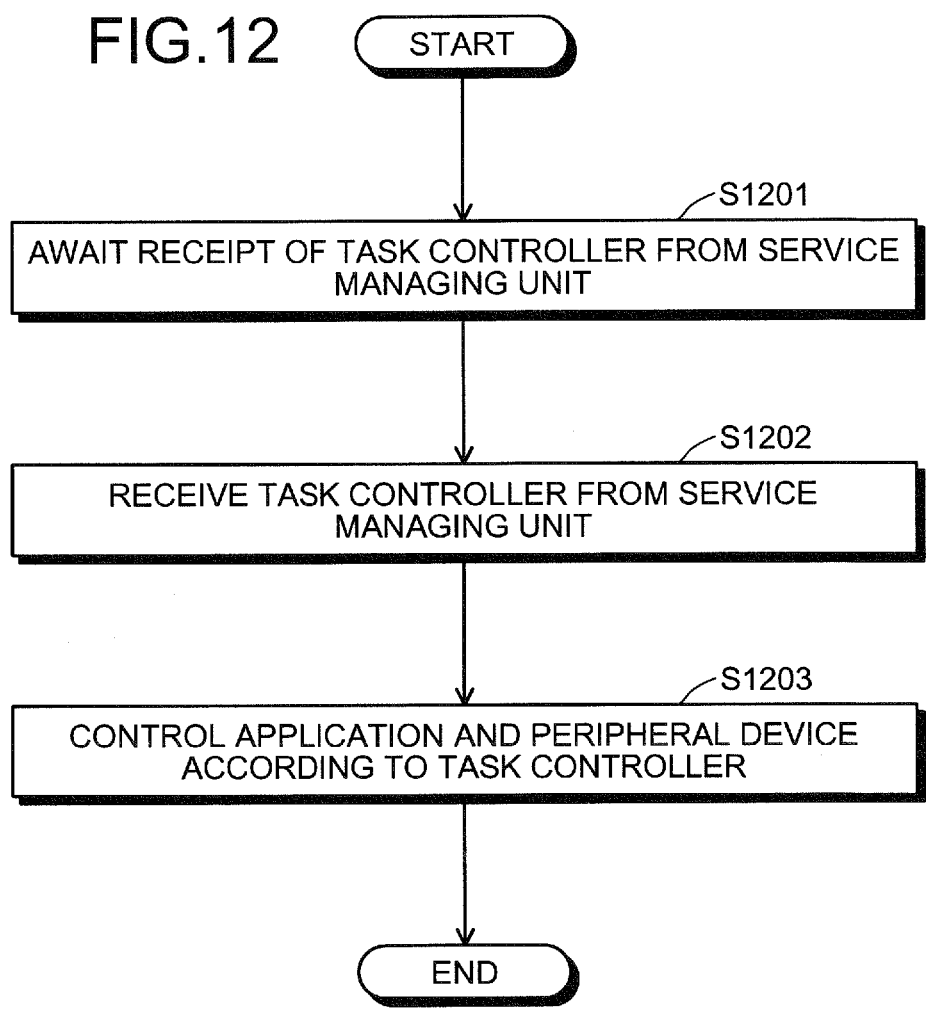

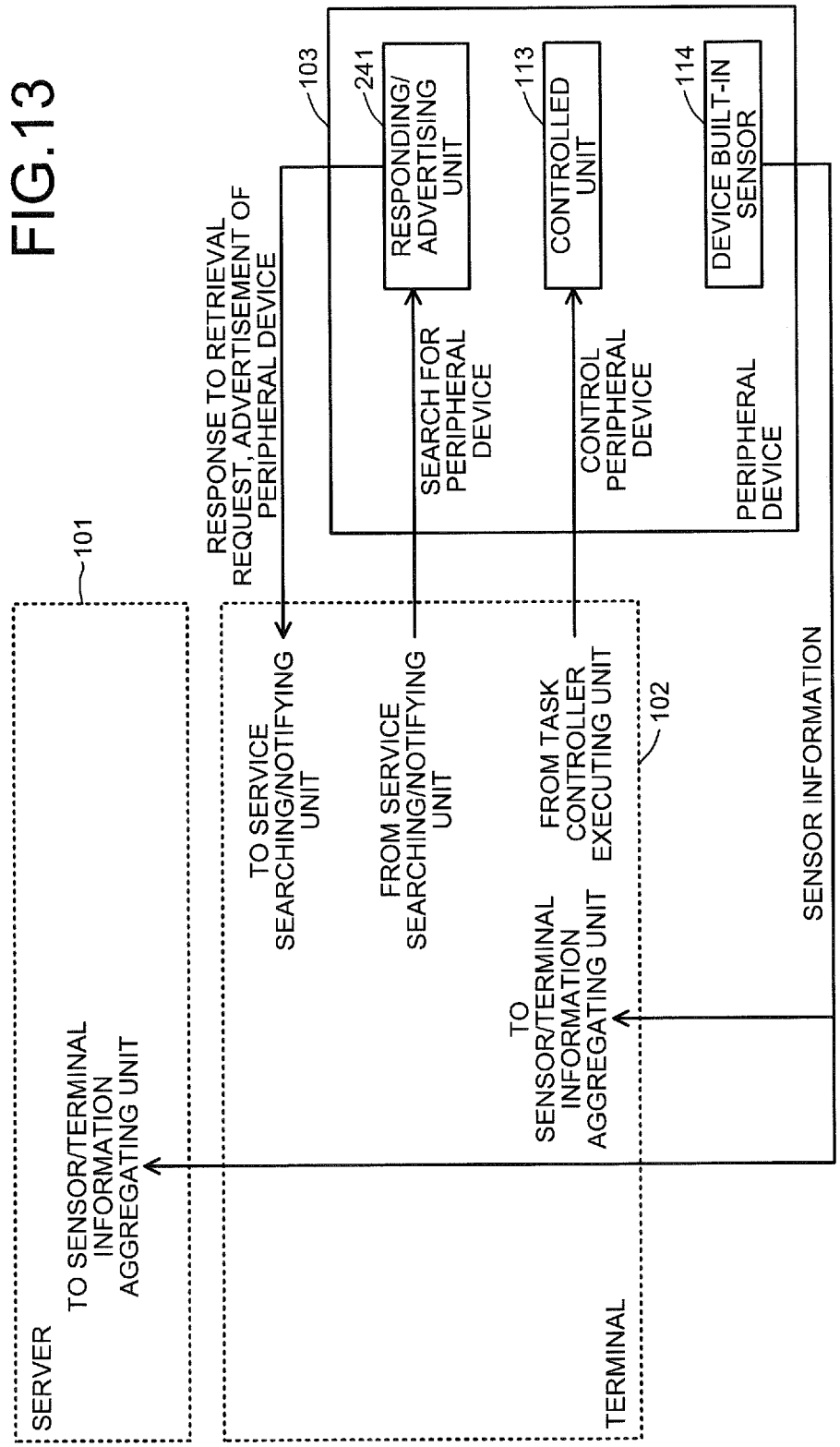

| TASK ID | USER | TASK |
|---------|------|------|
| T1 | USER A | PREPARE INGREDIENTS |
| T2 | USER A | CUT ONIONS INTO SMALL PIECES |
| T3 | USER A | PAN-FRY ONIONS |
| T4 | USER A | GRIND MEAT |
| T5 | USER A | MIX INGREDIENTS AND SHAPE INTO HAMBURGER STEAK |
| T6 | USER A | GRILL INGREDIENTS |

| TIME | SENSOR ID | TEMPERATURE |
|---|---|---|
| 10:00:00 | 1 | 200.4 |
| 10:00:00 | 2 | 160.2 |
| 10:00:01 | 1 | 200.6 |
| 10:00:01 | 2 | 160.5 |
| ... | ... | ... |

FIG.16

| | USER | TIME | PLACE | OTHERS |
|---|---|---|---|---|
| (1) | USER A | 10:00:15 | KITCHEN | STOVE 1. TEMPERATURE=180°C OR HIGHER, STOVE 2. TEMPERATURE=200°C OR HIGHER |
| ⋮ | ⋮ | ⋮ | ⋮ | ⋮ |

| | USER | ACQUIRED CONTEXT | ACQUISITION TIMING | CONDITION |
|---|---|---|---|---|
| (1) | USER A | TEMPERATURE | MEETING CONDITION | STOVE 1. TEMPERATURE≥180°C |
| (2) | USER A | TEMPERATURE | MEETING CONDITION | STOVE 2. TEMPERATURE≥200°C |

| TASK ID | CONTEXT CONDITION | PRIORITY LEVEL | DEPENDENCY-RELATED TASK ID |
|---|---|---|---|
| T1 | NULL | P1 | N/A |
| T2 | END OF T1 | P2 | T1 |
| T3 | END OF T2 && STOVE 1. TEMPERATURE≥180°C | P2 | T2 |
| T4 | END OF T1 | P1 | T1 |
| T5 | END OF T3 && END OF T4 | P1 | T3, T4 |
| T6 | END OF T5 && STOVE 2. TEMPERATURE≥200°C | P1 | T5 |

FIG.19
1900

| TASK ID | SERVICE |
|---|---|
| T1 | NULL |
| T2 | VEGETABLE CUTTER SERVICE |
| T3 | DEVICE TEMPERATURE ADJUSTING SERVICE, TIMER SERVICE |
| T4 | MEAT GRINDER SERVICE |
| T5 | INGREDIENT MIXER SERVICE |
| T6 | DEVICE TEMPERATURE ADJUSTING SERVICE, TIMER SERVICE |

2000

| DEVICE | SERVICE |
|---|---|
| VEGETABLE CUTER | VEGETABLE CUTTER SERVICE |
| STOVE 1 | DEVICE TEMPERATURE ADJUSTING SERVICE, TIMER SERVICE |
| STOVE 2 | DEVICE TEMPERATURE ADJUSTING SERVICE, TIMER SERVICE |
| GRINDER | MEAT GRINDER SERVICE |
| MIXER | INGREDIENT MIXER SERVICE |

WORKER A

2100

| TASK ID | CONTEXT CONDITION | PRIORITY LEVEL | DEPENDENCY-RELATED TASK ID |
|---|---|---|---|
| T1 | TIME 13:30 | 5 | N/A |
| T2 | END OF T1 | 5 | T1 |
| T3 | END OF T2 | 5 | T2 |
| ... | ... | ... | ... |

| TASK ID | SERVICE |
|---|---|
| T1 | NULL |
| T2 | NULL |
| T3 | NULL |
| ... | ... |

| | USER | ACQUIRED CONTEXT | ACQUISITION TIMING | CONDITION |
|---|---|---|---|---|
| (1) | WORKER A | TIME | MEETING CONDITION | TIME13:30 |

WORKER A

| TASK ID | RELATED INFORMATION (CONTENT URL) |
|---|---|
| T1 | http://carA_oil1.html |
| T2 | http://carA_oil2.html |
| T3 | http://carA_oil3.html |
| ... | ... |

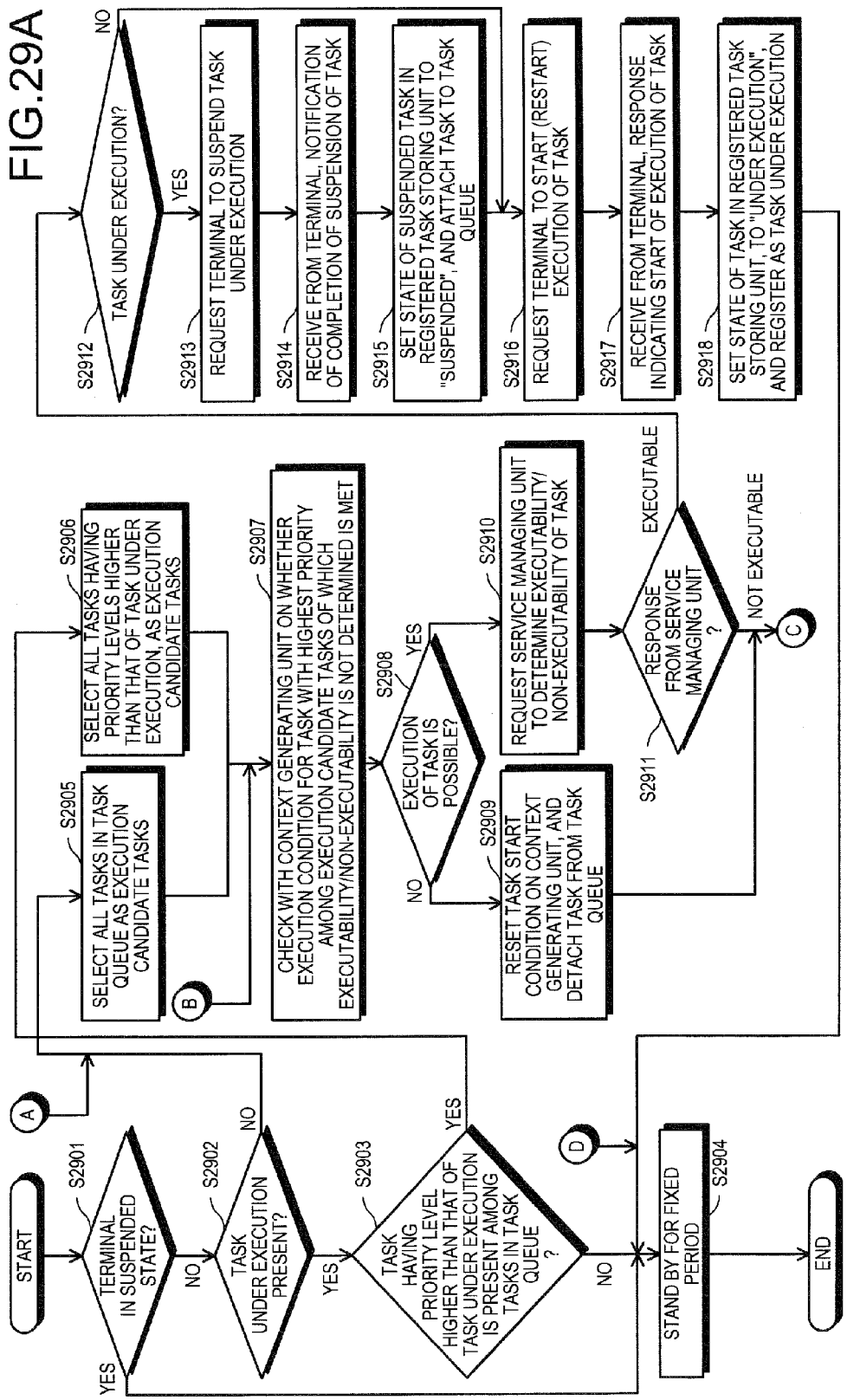

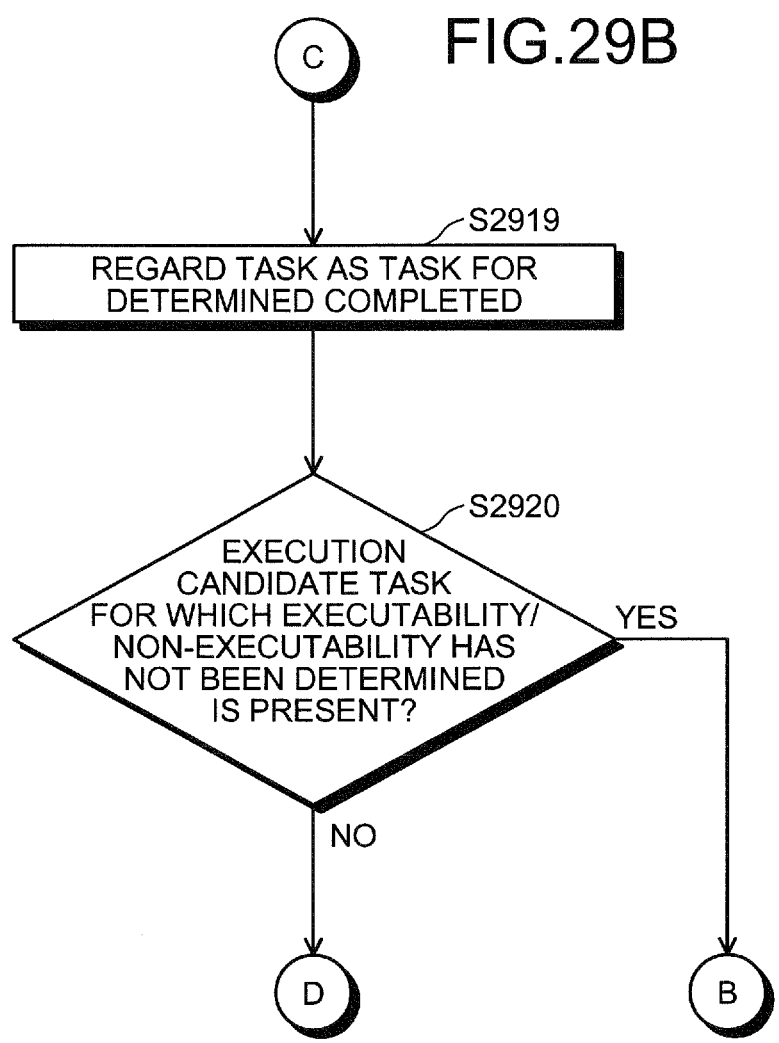

FIG.34

| UID | TID | TIME | PLACE | PRIORITY LEVEL | STATE |
|---|---|---|---|---|---|
| USER A | TASK 1 | 22:00 | CONTROL CENTER | MIDDLE | NOT EXECUTED |
| | TASK 2 | 22:00 - | WAREHOUSE A | MIDDLE | NOT EXECUTED |
| | ......... | | | | |
| # | TASK 3 | # | # | HIGH | NOT EXECUTED |

| TID | CONTROLLER URL |
|---|---|
| TASK 1 | url1 |
| TASK 2 | url2 |
| TASK 3 | url3 |

| TID | DEVICE NAME | SERVICE NAME |
|---|---|---|
| TASK 1 | NA | NA |
| TASK 2 | LIGHTING | LIGHTING CONTROL |
| TASK 3 | NA | NA | ional Application PCT/JP2011/058144, filed on Mar. 30, 2011 and designating the U.S., the entire contents of which are incorporated herein by reference.

TASK EXECUTION CONTROL FOR GENERATING CONTEXT INFORMATION OF A USER TO LOCATE AVAILABLE SERVICES

CROSS REFERENCE TO RELATED APPLICATIONS

This application is a continuation application of International Application PCT/JP2011/058144, filed on Mar. 30, 2011 and designating the U.S., the entire contents of which are incorporated herein by reference.

FIELD

The embodiments discussed herein are related to a task execution controller, a task execution control system, and task execution control method that execute tasks according to the state of a user.

BACKGROUND

With advances in sensing device technology, measuring the position and surrounding environment of a user has become easier. From such measurement data, various types of context can be obtained, and use of this context aids in the execution of a task for the user. Such context represents information indicative of the situation of a person and/or a thing. For example, the context of a user A is information indicating the name of an office, which represents the current location of the user A, the current time, etc. A task means work that is to be executed by the user, a terminal of the user, or a peripheral device of the user. For example, when the user enters a room, a task may be "to turn on lights in the room", and when the user prints out documents, a task may be "to print sentences using a printer nearby".

According to a conventional technique related to task execution support using context, in a content distribution network, the content desired by a user is moved to storage near an access point for the user, based on context information of the user (information indicating the user's position, a network use status, a work status), to perform load distribution (see, for example, Japanese Laid-Open Patent Publication No. 2004-348495). According to another conventional technique, in a presence service of displaying on a terminal, context information of a user (circumstances of a person on the other side of the phone line), a suitable presence information providing application is executed according to the context of the user (see., for example, Japanese Laid-Open Patent Publication No. 2008-282068).

According to the conventional techniques, however, a service provided by a peripheral device for executing a task cannot be confirmed, and therefore, a suitable task cannot be selected by the service provided by the peripheral device. This service represents a function that is provided by the peripheral device and has low granularity, such as a service performed through the Universal Plug and Play (UPnP) protocol. A specific example of such a service is printing by a printer, etc.

The conventional techniques offer a system that assumes execution of a single task only. As a result, when multiple tasks are present, the system cannot select and execute a task in an execution order determined by considering the context of the user and therefore, cannot efficiently execute the service desired by the user. The service desired by the user is assumed to be a service made up of a combination of tasks or each different service that the user enjoys at different locations to which the user moves. The system of the conventional techniques cannot support such a service.

SUMMARY

According to an aspect of an embodiment, a task execution controller includes a context generating unit that generates context information concerning a user and a surrounding situation of the user; a task managing unit that stores multiple tasks the user attempts to execute, selects a task according to the context information and a predetermined task selection rule, and controls execution of the task; and a service managing unit that confirms services executed by a device used for execution of the task, gives notification of a service corresponding to the execution of the task selected by the task managing unit, to the device and causes the device to perform the service. The task managing unit selects a task by using, as the task selection rule, information of priority levels of tasks and an execution-related dependency relation between tasks preset among the tasks.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is an explanatory diagram of a process by a service managing unit;

FIG. 9 is a flowchart of a process by the service managing unit;

FIG. 10 is an explanatory diagram of a process by a peripheral device linking unit;

FIG. 11 is a flowchart of a service search process by the peripheral device linking unit;

FIG. 12 is a flowchart of a process related to a task controller executed of the peripheral device linking unit;

FIG. 13 is an explanatory diagram of a process by a peripheral device;

FIG. 14A is a table indicating specific examples of tasks;

FIG. 15 is a table of an example of data collected from a terminal or peripheral device;

FIG. 16 is a table of an example of generated context information;

FIG. 17 is table of an example of context acquisition control information;

FIG. 18 is a table of an example of a task selection rule;

FIG. 19 is a table of an example of a task/service correspondence relation;

FIG. 22 is a table of an example of a task/service correspondence relation;

FIG. 23 is a table of an example of context acquisition control information;

FIG. 24 is a table of an example of additional information of registered tasks;

FIGS. 29A and 29B are flowcharts of a process by the task managing unit of checking a service for a task standing by for execution;

FIG. 34 is a table of an example of task management information;

FIG. 35 is a table of an example of task controller management information;

FIG. 36 is a table of an example of task/service corresponding information; and

DESCRIPTION OF EMBODIMENTS

Preferred embodiments will be described in detail with reference to the accompanying drawings.

The disclosed technique is a technique for controlling the execution of a task of a user. For example, a task execution controller that supervises task execution control performs the following control processes.
1. Generate context for the user.
2. A task management function selects a task to be executed, based on the context of the user. A selection rule (execution-related dependency relation between tasks, indicative of priority levels and task flows) is set for each task.
3. A service management function determines whether a task is executable, based on available service information that the output device (terminal, peripheral device, etc.) has.
4. A peripheral device control function controls an application executed by the terminal and the peripheral device, causes the peripheral device to execute the task, and provides a service corresponding to the context of the user.

Figure 1:
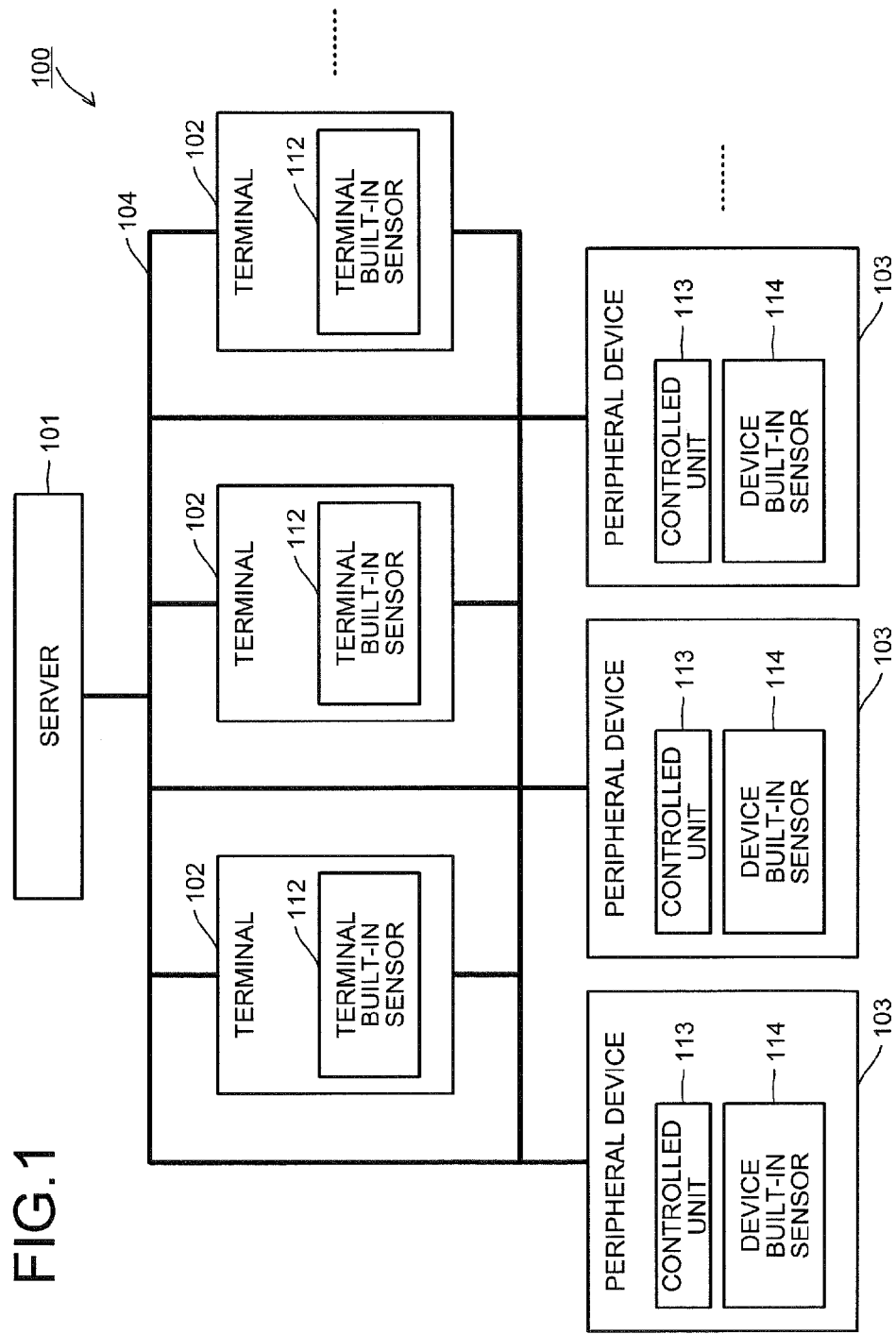
FIG. 1 depicts a schematic configuration of a task execution control system according to embodiments.

FIG. 1 depicts a schematic configuration of a task execution control system according to embodiments. A task execution control system 100 includes a server 101, multiple terminals 102, and multiple peripheral devices (controlled devices) 103. The server 101, terminals 102, and peripheral devices 103 are interconnected through an information communication network 104 and exchange various types of information. The information communication network is provided as a wired network or a radio network.

The server 101 is a computer that can communicate with the terminals 102 and with the peripheral devices 103, and has functions of context generation, task management, service management, etc. Each function of the server 101 can be implemented by causing a CPU to execute software stored in ROM, RAM, etc., and can also be implemented by hardware.

Each terminal 102 is a device possessed by the user and includes an information communication unit and a computer processing unit, and is provided as, for example, a PC, note PC, cellular phone, PDA, smart phone, etc. The terminal 102 may be equipped with a terminal built-in sensor 112, such as GPS for position measurement and an acceleration sensor for acceleration detection. The terminal 102 aggregates information concerning measurement by the terminal built-in sensor 112 and sends the measurement information to the server 101, which can use the measurement information as information for context generation. One terminal 102 can communicate with the peripheral devices 103 through the information communication network 104. Each function of the terminal 102 can be implemented by causing a CPU to execute software stored in ROM, RAM, etc., and can also be implemented by hardware.

Each peripheral device 103 has a controlled unit 113 that can actuate various functions of the peripheral device 103 using information from the information communication unit and the information communication network 104. The peripheral device 103 is provided as, for example, a computer, printer, projector, TV set, lighting, etc. The peripheral device 103 may be equipped with a device built-in sensor 114, such as GPS and an acceleration sensor. The peripheral device 103 aggregates information concerning measurement by the device built-in sensor 114 and sends the measurement information to the server 101, which can use the measurement information as information for context generation. The user's terminal 102 may be used as the peripheral device 103.

Figure 2:
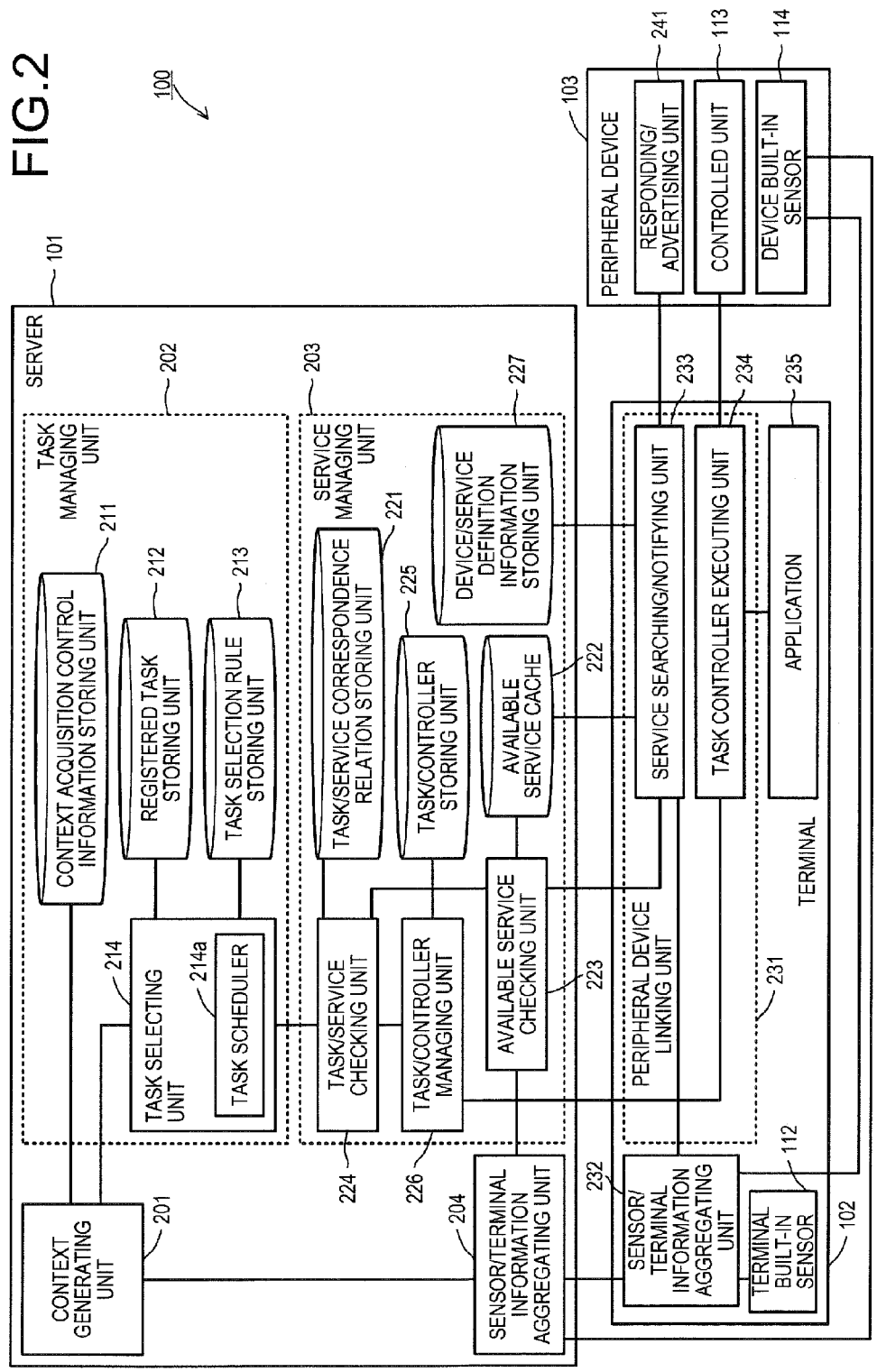
FIG. 2 depicts a detailed configuration of a task execution control system according to a first embodiment.

FIG. 2 depicts a detailed configuration of a task execution control system according to a first embodiment. The internal functions of the server 101, the terminal 102, and the peripheral device 103 of the task execution control system 100 will hereinafter be described.

The server 101 includes a context generating unit 201, a task managing unit 202, a service managing unit 203, and a sensor/terminal information aggregating unit 204.

The context generating unit 201 makes a judgment on the user and the surroundings thereof (context) and generates information (context) of the user and the surroundings. The context indicates, for example, a place; time; actions, physical condition, and ability of the user; the surrounding environment of the user; etc. The context also includes information concerning work that the user is engaged in, such as information of a schedule and a job to execute. The generated context information is output to the task managing unit 202.

The task managing unit 202 retains task information, and controls task execution according to the context of the user and information of the peripheral device 103. The task managing unit 202 includes a context acquisition control information storing unit 211, a registered task storing unit 212, a task selection rule storing unit 213, and a task selecting unit 214.

The context acquisition control information storing unit 211 transmits to the context generating unit 201, the granularity of context and timing of context acquisition as context acquisition control information. The registered task storing unit 212 stores a list of tasks registered by the user. The task selection rule storing unit 213 sets the order in which tasks are to be executed, based on the priority order of the tasks and work flow. Based on context information transmitted from the context generating unit 201, the task selecting unit 214 selects an execution task from the registered task storing unit 212 according to a task selection rule, and performs scheduling of task execution via a task scheduler 214a.

The task selection rule is set in the form of a table in which a context condition for each task, the priority level (priority order) of each task, and dependency task information indicating the dependency of each task on another task (dependency task ID) are correlated with each other for each task to which a task ID is given. A task ID is an ID for identifying a task. A context condition is a condition that is checked against information from the context generating unit 201. When the condition matches the information, the task corresponding to the condition is executed. A priority level is set so that when multiple executable tasks are present, the tasks are executed in descending order of priority level. A dependency task ID is the ID of a task that must end before the execution of an execution task.

The service managing unit 203 confirms available services of the peripheral device 103 and notifies the task managing unit 202, and to execute a task selected by the task managing unit 202, transmits a command or program for using a necessary service to the terminal 102. The service managing unit 203 includes a task/service correspondence relation storing unit 221, an available service cache 222, an available service checking unit 223, a task/service checking unit 224, a task/controller storing unit 225, a task/controller managing unit 226, and a device/service definition information storing unit 227.

The task/service correspondence relation storing unit 221 stores correspondence relation information of services necessary for executing tasks. The correlation between a task and a service can be obtained by referring to a table. The available service cache 222 temporarily stores a service notified from the terminal 102 that is available at the peripheral device 103 that is near the terminal 102. The available service checking unit 223 checks whether a service for executing a task is present by referring to the available service cache 222, and if no service is present, makes a search request to the terminal 102.

To check whether a task for which notification is received from the task managing unit 202 is executable, the task/service checking unit 224 acquires service information corresponding to the task, from the task/service correspondence relation storing unit 221, and compares the acquired service information against service information acquired from the available service checking unit 223. The task controller storing unit 225 stores a task controller for executing a task. The task controller is software that controls a service for executing a task. One task controller can control multiple tasks.

When a task is executable, the task/controller managing unit 226 acquires the controller corresponding to the task, from the task controller storing unit 225, and transmits the acquired controller to the terminal 102. The device/service definition information storing unit 227 stores a device/service definition of the peripheral device 103 and transmits the device/service definition to the terminal 102. The device/service definition is data describing the device type of the peripheral device 103 and the service that the controlled unit 113 of the peripheral device 103 can provide or is a file describing a service. For example, the device/service definition is composed of an XML file describing a device definition and a service definition in an UPnP platform.

The sensor/terminal information aggregating unit 204 aggregates data based on sensor information transmitted from the terminal 102 or the peripheral device 103, or based on available service information of the peripheral device 103, transmitted from the available service checking unit 223, and transmits the aggregated data as information for context generation, to the context generating unit 201.

The terminal 102 includes the terminal built-in sensor 112, a peripheral device linking unit 231, and a sensor/terminal information aggregating unit 232. The peripheral device linking unit 231 searches a service of the peripheral device 103 that is near the terminal 102 and communicates the searched service to the server 101, and controls the peripheral device 103 according to a program or command from the server 101. The peripheral device linking unit 231 includes a service searching/notifying unit 233 and a task controller executing unit 234.

The service searching/notifying unit 233 searches a service of the peripheral device 103 near the terminal 102 and notifies the server 101 of the found service. To search a service, for example, M-SEARCH in the UPnP protocol is used. The task controller executing unit 234 downloads a task controller transmitted from the server 101 and supervises control over the peripheral device 103 and execution of the application 235. The sensor/terminal information aggregating unit 232 collects and aggregates data from sensor information provided by the device built-in sensor 114 of the peripheral device 103 near the terminal 102, and transmits the aggregated data to the server 101.

The peripheral device 103 includes the controlled unit 113, the device built-in sensor 114, and a responding/advertising unit 241. The responding/advertising unit 241 makes a response to a device search message from the terminal 102 near the peripheral device 103, and regularly advertises the presence of the peripheral device 103 and device information to the terminal 102. The controlled unit 113 follows a control command from the terminal 102 and controls a function that the peripheral device 103 has.

Figure 3:
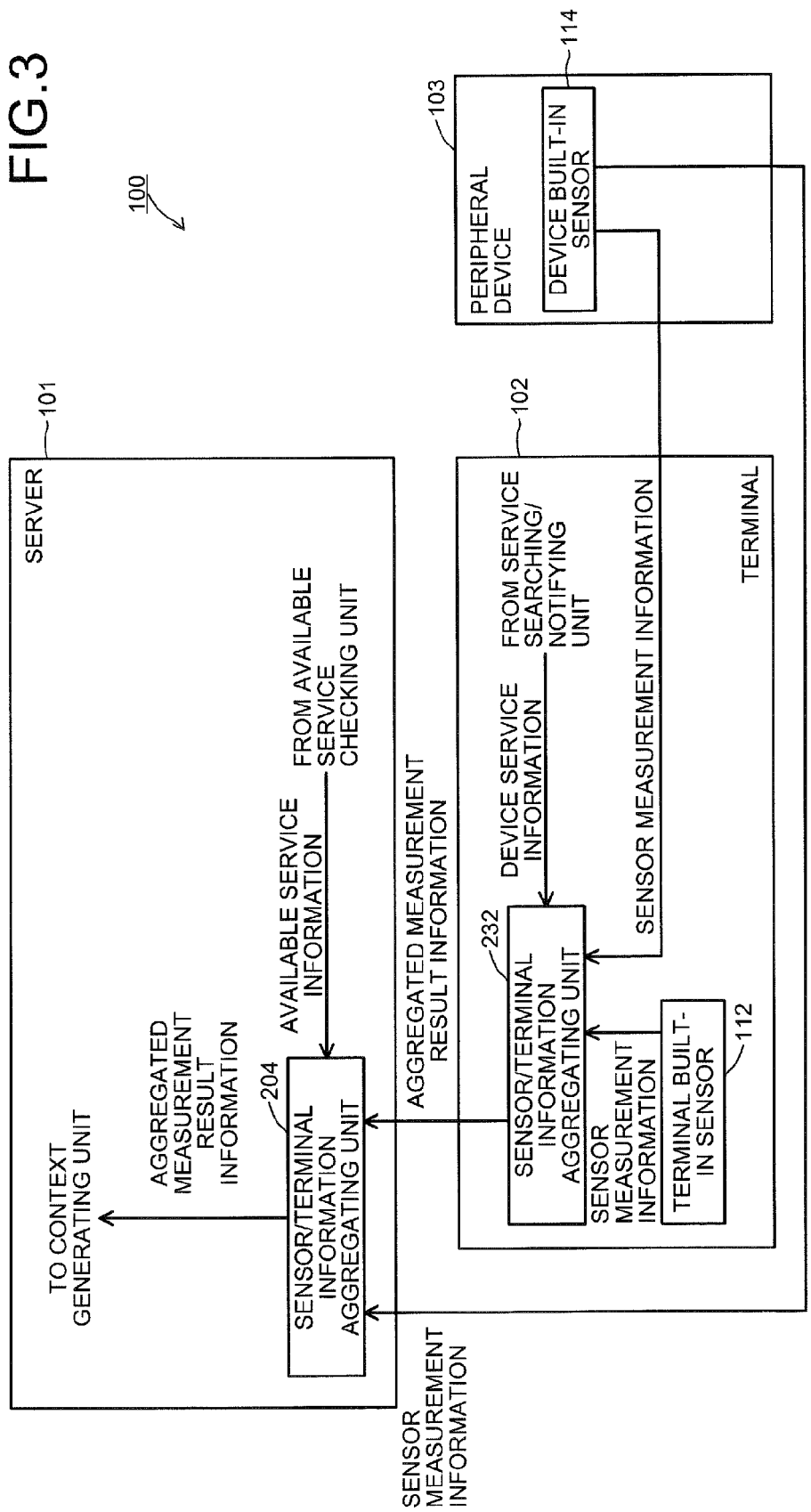
FIG. 3 is a block diagram for explaining an information collecting function.

An information collecting process executed in the above configuration will be described. FIG. 3 is a block diagram for explaining an information collecting function. A sensor information collecting process by the sensor/terminal information aggregating unit 204 and the sensor/terminal information aggregating unit 232 incorporated in the server 101 and the terminal 102, respectively, will be described, referring to FIG. 3.

Sensor information aggregated by the sensor/terminal information aggregating unit 232 of the terminal 102 is collected by the sensor/terminal information aggregating unit 204 of the server 101, where the sensor information is processed in the same manner as in the sensor/terminal information aggregating unit 232 in the terminal 102. The sensor information aggregated by the terminal 102 may be aggregated by the sensor/terminal information aggregating unit 232 in a different terminal 102, without being transmitted directly to the sensor/terminal information aggregating unit 204 of the server 101 and then transmitted as aggregated information, to the server 101. Data measured by the device built-in sensor 114 in the peripheral device 103 may be transmitted directly to the sensor/terminal information aggregating unit 204 in the server 101, without being transmitted to the sensor/terminal information aggregating unit 232 of the terminal 102.

The sensor/terminal information aggregating unit 232 of the terminal 102 can aggregate measurement data for reducing the volume of traffic and data processing required for transferring sensor information to the server 101. As an example of data aggregation, the sensor/terminal information aggregating unit 232 averages data measured at 10:00:00 and data measured at 10:00:05, and then replaces both data with the calculated average as data measured at 10:00:00. In this manner, the data of two measurements are aggregated into one that is of a smaller size and transferred to the server 101.

Figure 4:
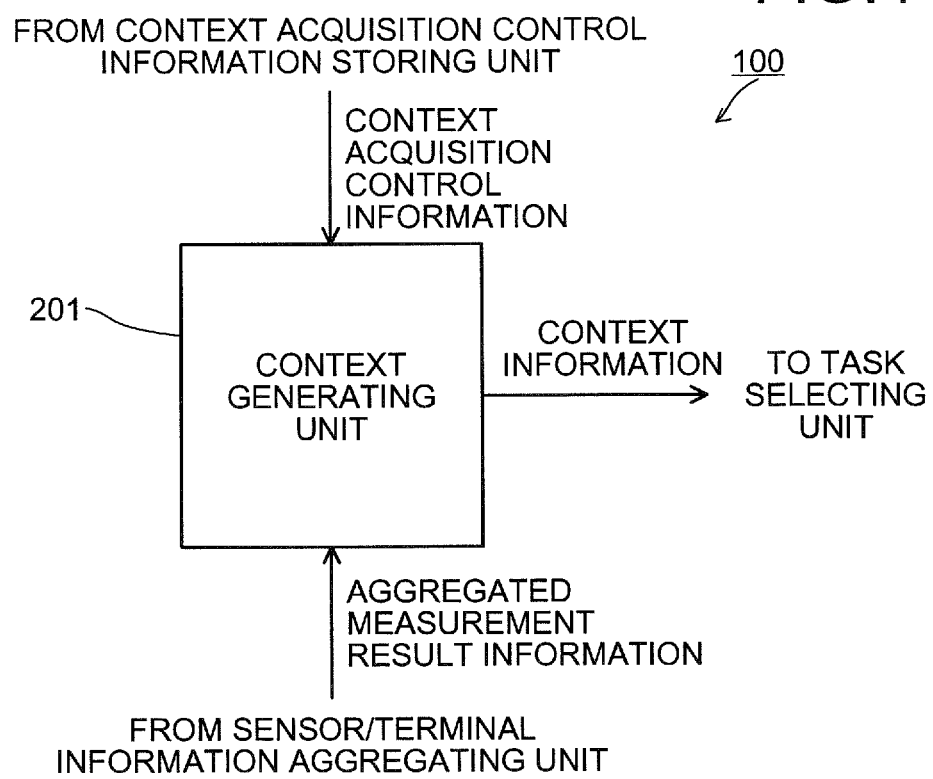
FIG. 4 is an explanatory diagram of a process by a context generating unit.

FIG. 4 is an explanatory diagram of a process by the context generating unit. A process of generating context and transmitting context information to the task managing unit 202 by the context generating unit 201 of the server 101 will be described. The context generating unit 201 acquires from the sensor/terminal information aggregating unit 204, sensor information and information of the peripheral device 103 and also acquires context acquisition control information from the context acquisition control information storing unit 211. Based on the sensor information, information of the peripheral device 103, and context acquisition control information, the context generating unit 201 generates context and sends the context to the task selecting unit 214.

Figure 5:
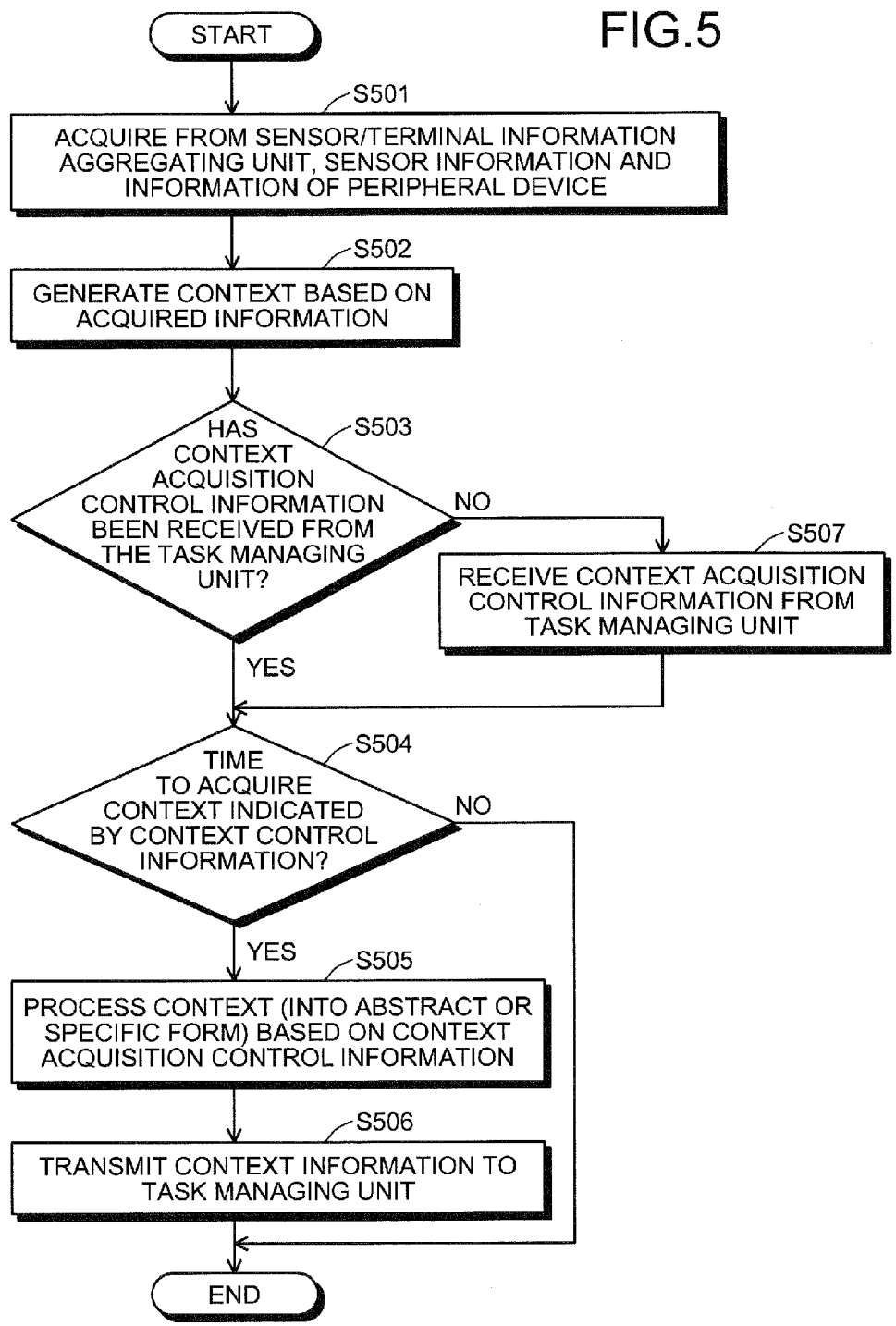
FIG. 5 is a flowchart of a process by the context generating unit.

FIG. 5 is a flowchart of the process by the context generating unit. The context generating unit 201 acquires from the sensor/terminal information aggregating unit 204, sensor information and information of the peripheral device 103 (step S501). Based on the acquired information, the context generating unit 201 generates context (step S502). The context generating unit 201 determines whether context acquisition control information has been received from the task managing unit 202 (step S503). If the context acquisition control information has been received (step S503: YES), the context generating unit 201 determines whether it is time to acquire the context indicated by the context control information (step S504). If it is time to acquire the context (step S504: YES), the context generating unit 201 processes the context (into an abstract or specific form) based on the context acquisition control information (step S505), and transmits context information to the task managing unit 202 (step S506).

If it is not time for the task managing unit 202 to acquire the context (step S504: NO), the context generating unit 201 ends the process, and again executes the operations at step S501 and at subsequent steps, at the next time to acquire context.

If the context generating unit 201 determines at step S503 that the context acquisition control information has not yet been received from the task managing unit 202 (step S503: NO), the context generating unit 201 receives context acquisition control information from the task managing unit 202 (step S507), and executes the operations at step S504 and at subsequent steps.

Figure 6:
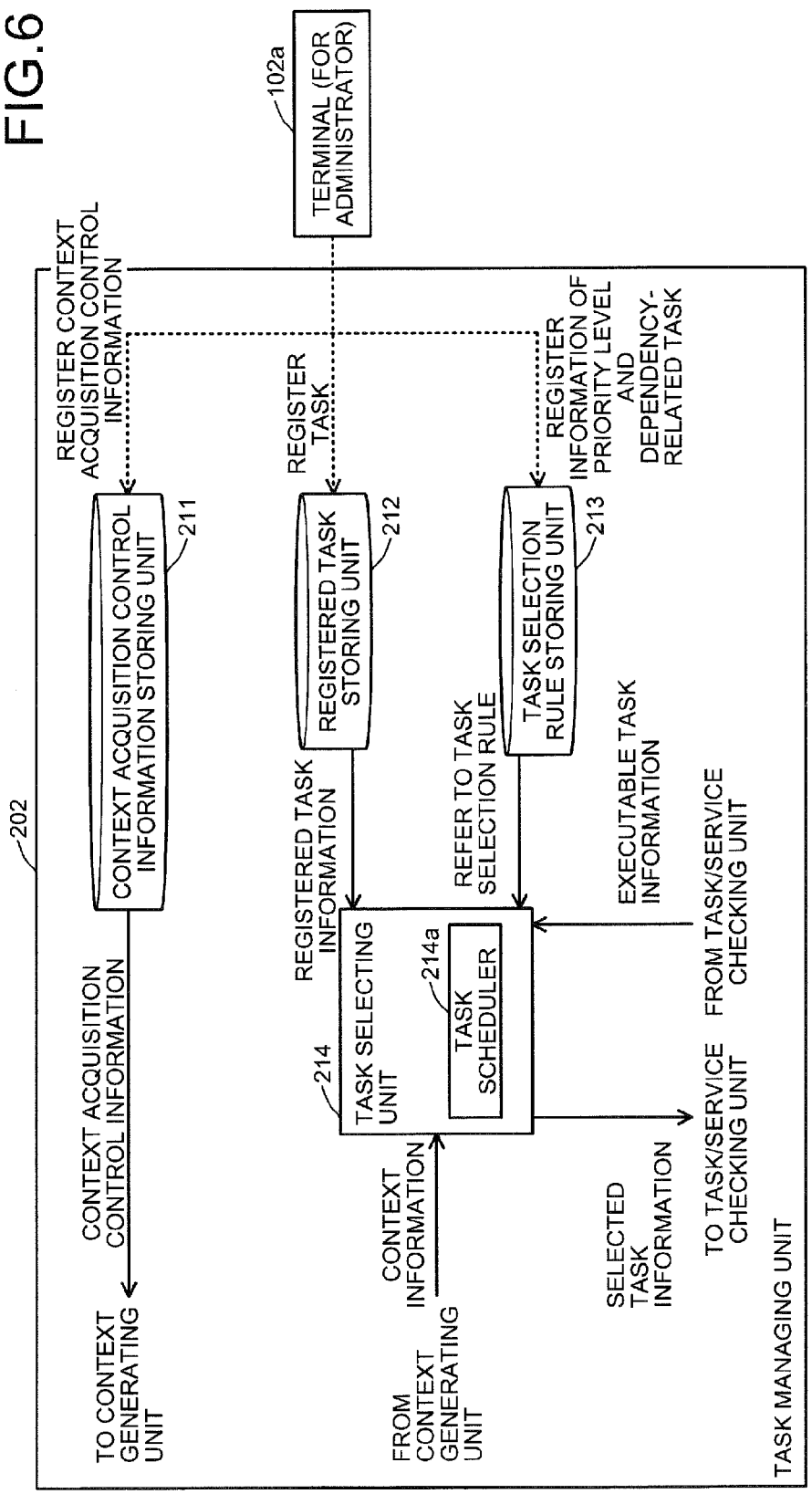
FIG. 6 is an explanatory diagram of a process by a task managing unit.

FIG. 6 is an explanatory diagram of a process by the task managing unit. A process by the task managing unit 202 of selecting a task and transmitting task information to the service managing unit 203 will be described. The task selecting unit 214 selects an executable task from the registered task storing unit 212, based on context information and a task selection rule (including information of priority levels, dependency task IDs, etc.) stored in the task selection rule storing unit 213. If one or more executable tasks are present, based on information from the service managing unit 203 (task/service checking unit 224), the task selecting unit 214 transmits to the service managing unit 203, information of a task having the highest priority level among selected tasks.

An administrator terminal 102a is connected to the server 101 (task managing unit 202), in which context acquisition control information is stored in the context acquisition control information storing unit 211, task information is stored in the registered task storing unit 212, and information of the priority levels (priority order) of tasks and dependency tasks (dependency task IDs) is stored in the selection rule storing unit 213.

Figure 7:
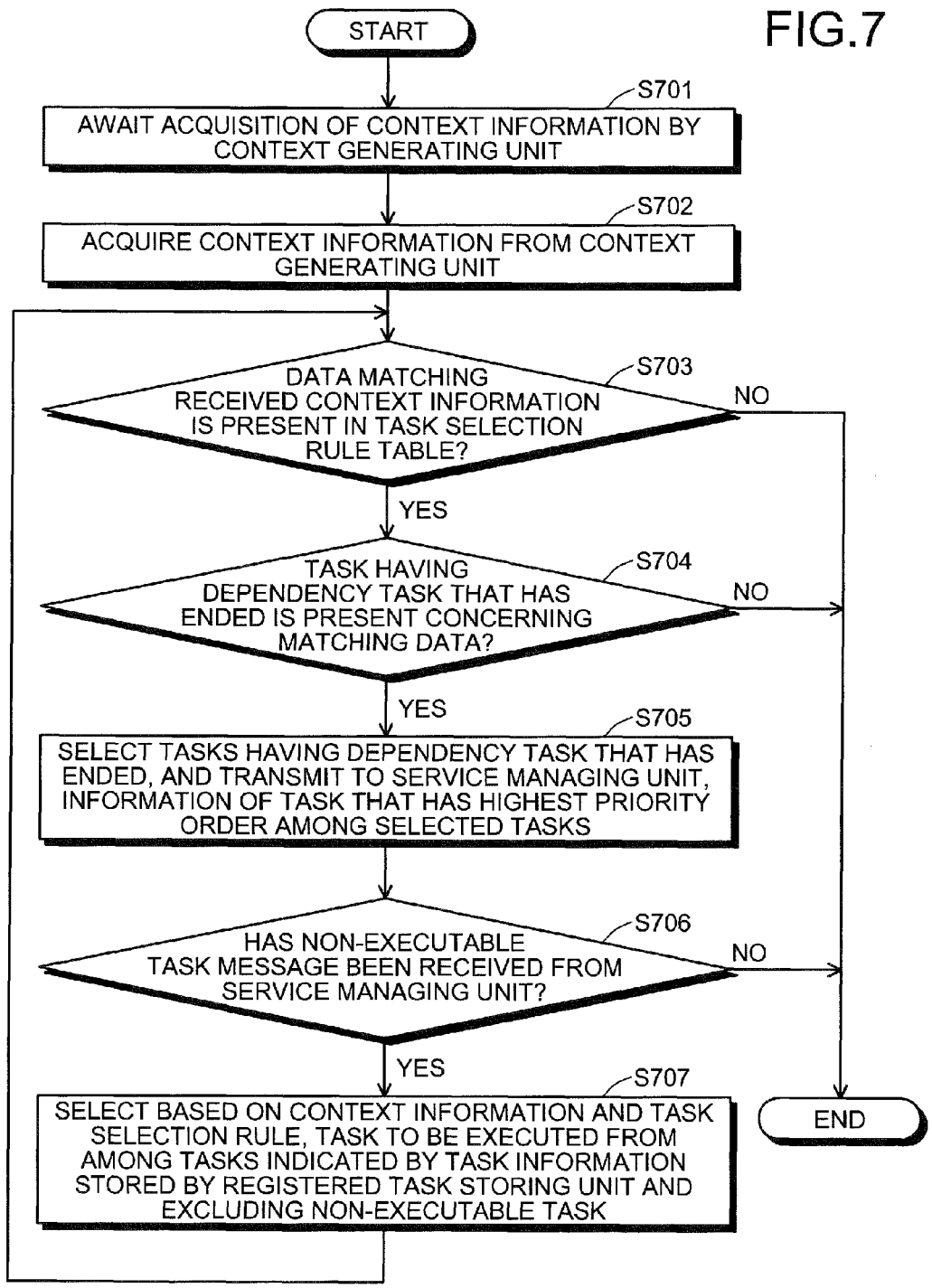
FIG. 7 is a flowchart of a process by the task managing unit.

FIG. 7 is a flowchart of a process by the task managing unit. A process executed by the task selecting unit 214 of the task managing unit 202 will be described. The task selecting unit 214 awaits the acquisition of context information by the context generating unit 201 (step S701), and then acquires the context information from the context generating unit 201 (step S702).

The task selecting unit 214 determines whether data matching the received context information is present in a task selection rule table (step S703). If matching data is present (step S703: YES), the task selecting unit 214 determines whether a task having a dependency task that has ended is present concerning the matching data (step S704).

If a task having a dependency task that has ended is present (step S704: YES), the task selecting unit 214 selects the tasks having a dependency task that has ended, and transmits to the service managing unit 203, information of the task that has the highest priority order among the selected tasks (step S705). If data matching the received context information is not present at step S703 (step S703: NO) and no task having a dependency task that has ended is present at step S704 (step S704: NO), the task selecting unit 214 ends the task selecting process.

Following execution of step S705, the task selecting unit 214 determines whether a non-executable task message has been received from the service managing unit 203 (step S706). If a non-executable task message has been received (step S706: YES), the task selecting unit 214 again selects based on the context information and the task selection rule, a task to be executed from among tasks indicated by task information stored by the registered task storing unit 212 and excluding the non-executable task, (step S707), and returns to step S703. If a non-executable task message has not been received from the service managing unit 203 (step S706: NO), the task selecting unit 214 ends the task selecting process.

FIG. 8 is an explanatory diagram of a process by the service managing unit. A process for confirming a service and transmitting a task controller by the service managing unit 203 will be described. The task/service checking unit 224 acquires information of a task for which notification has been received from the task managing unit 202 (task selecting unit 214). The task/service checking unit 224 also acquires from the task/service correspondence relation storing unit 221, service information corresponding to the task and acquires service information from the available service checking unit 223. The task/service checking unit 224 thus checks the transmitted information of the task against the service information to see if the task is executable.

The task controller managing unit 226 acquires executable task information (execution task information) from the task/service checking unit 224, further acquires the task controller corresponding to the executable task information from the task controller storing unit 225, and transmits the acquired task controller to the terminal 102. The device/service definition information storing unit 227 stores the device/service definition of the peripheral device 103. The terminal 102 refers to the device/service definition information storing unit 227 for a service of the peripheral device 103 searched by the terminal 102, and receives notification of the service. The available service cache 222 stores device service information from the terminal 102, and is referred to by the available service checking unit 223 when the available service checking unit 223 checks a service to use. The device service information stored in the available service cache 222 is deleted after a given period elapses.

The administrator terminal 102a is connected to the server 101 (service managing unit 203), in which information of the correlation between tasks and services is stored in the task/service correspondence relation storing unit 221, task controllers are stored in the task controller storing unit 225, and device/service definitions are stored in the device/service definition information storing unit 227.

FIG. 9 is a flowchart of a process by the service managing unit. The process executed by the service managing unit 203 will be described. The task/service checking unit 224 awaits acquisition of task information by the task managing unit 202 (step S901), and then acquires the task information from the task managing unit 202 (step S902). The task/service checking unit 224 acquires from the task/service correspondence relation storing unit 221, a service for executing the task indicated by the task information (step S903).

The task/service checking unit 224 checks whether service information of the acquired service is present in the available service cache 222 via the available service checking unit 223 (step S904). If the service information is present (step S904: YES), the task controller managing unit 226 acquires a task controller for executing the task, from the task controller storing unit 225 (step S905), transmits the acquired task controller to the terminal 102 (step S906), and ends the processing of one task.

If the service information is not present in the available service cache (step S904: NO), the task/service checking unit 224 checks whether the available service checking unit 223 has made a request for searching a service of the peripheral device 103 a given number of times or more, to the terminal 102 (step S907). If the service checking unit 223 has made the request a given number of times or more (step S907: YES), the task/service checking unit 224 transmits a non-executable task message to the task managing unit 202 (step S908), and ends one cycle of the process.

At step S907, if the available service checking unit 223 has not made the request for searching the service of the peripheral device 103 a given number of times or more, to the terminal 102 (step S907: NO), the available service checking unit 223 transmits to the terminal 102, the request for searching the service of the peripheral device 103 (step S909), and after the elapse of a given period, checks the available service cache 222 (step S910). Subsequently, the process flow returns to step S904.

FIG. 10 is an explanatory diagram of a process by the peripheral device linking unit. Service search performed by the peripheral device linking unit 231 of the terminal 102 and device control performed by the task controller will be described. The service searching/notifying unit 233 searches the peripheral device 103 in response to a request for searching a service of the peripheral device 103 made by the service managing unit 203 (available service checking unit 223) of the server 101. Based on a response from the peripheral device 103, the service searching/notifying unit 233 acquires the service of the peripheral device 103 from device/service definition information storing unit 227, and transmits the service of the peripheral device 103 to the available service cache 222 of the service managing unit 203 and to the sensor/terminal information aggregating unit 232.

The task controller executing unit 234 controls the application 235 and the peripheral device 103 according to a received task controller from the service managing unit 203 (task controller managing unit 226).

FIG. 11 is a flowchart of a service search process by the peripheral device linking unit. The service search process executed by the service searching/notifying unit 233 of the peripheral device linking unit 231 will be described. The service searching/notifying unit 233 awaits receipt of a request that is from the service managing unit 203 of the server 101 and for the search of a service of the peripheral device 103 (available service checking unit 223) (step S1101). Upon receiving the request for searching the service of the peripheral device 103 from the service managing unit 203 (step S1102), the service searching/notifying unit 233 searches for the peripheral device 103 (step S1103).

Upon receiving a response to the search from the peripheral device 103 (step S1104), the service searching/notifying unit 233 acquires the service of the peripheral device 103 from the device/service definition information storing unit 227, according to the response to the search from the peripheral device 103 (step S1105). The service searching/notifying unit 233 transmits the acquired service to the available service cache 222 of the service managing unit 203 (step S1106) and to the sensor/terminal information aggregating unit 232 (step S1107), and ends one cycle of the process.

FIG. 12 is a flowchart of a process related to a task controller executed by the peripheral device linking unit. A process of receiving and executing a task controller performed by the task controller executing unit 234 of the peripheral device linking unit 231 will be described. The task controller executing unit 234 awaits receipt of a task controller from the service managing unit 203 (task controller managing unit 226) of the server 101 (step S1201). Upon receiving a task controller from the service managing unit 203 (step S1202), the task controller executing unit 234 controls the application 235 and the peripheral device 103 according to the received task controller (step S1203), and ends one cycle of the process.

FIG. 13 is an explanatory diagram of a process by the peripheral device. Upon receiving a device search message from the peripheral device linking unit 231 (service searching/notifying unit 233) of the terminal 102, the responding/advertising unit 241 sends a response indicating the presence of the peripheral device 103 and device information. The controlled unit 113 follows a control command from the peripheral device linking unit 231 (task controller executing unit 234) of the terminal 102 to execute/control a function that the peripheral device 103 has. The device built-in sensor 114 sends sensor measurement information to the sensor/terminal information aggregating unit 232 of the terminal 102 or to the sensor/terminal information aggregating unit 204 of the server 101.

A specific example of a process of task execution will be described. An example of providing cooking support as a task by the peripheral device 103 will first be described.

This task represents work of preparing and cooking individual ingredients in a cooking procedure, in which cooking is performed automatically according to a pre-registered dependency relation. Each peripheral device 103 (cooking instrument) can be operated from the terminal 102. The cooking instrument is equipped with a temperature sensor, timer, etc., which is equivalent to the device built-in sensor 114.

FIG. 14A is a table indicating specific examples of tasks and depicts task information 1400 concerning the cooking of hamburger steaks. The information 1400 is stored in the registered task storing unit 212. The task information 1400 is composed of information concerning task IDs, users, and tasks. Task IDs T1 to T6 are set in the table of task information 1400, where a task with the task ID T1 is "prepare ingredients", to which a user "A" corresponds. Tasks following the task T1 in descending order are cooking tasks, among which a task with the task ID T6 is "bake the ingredient", to which the user "A" corresponds. The tasks T1 to T6 are executed by controlling the cooking instrument, which is the peripheral device 103, via the terminal 102. In execution of the task T1, information indicative of an instruction to "prepare ingredients" is displayed on the display unit (not depicted) of the terminal 102 to give the instruction to the user.

Figure 14B:
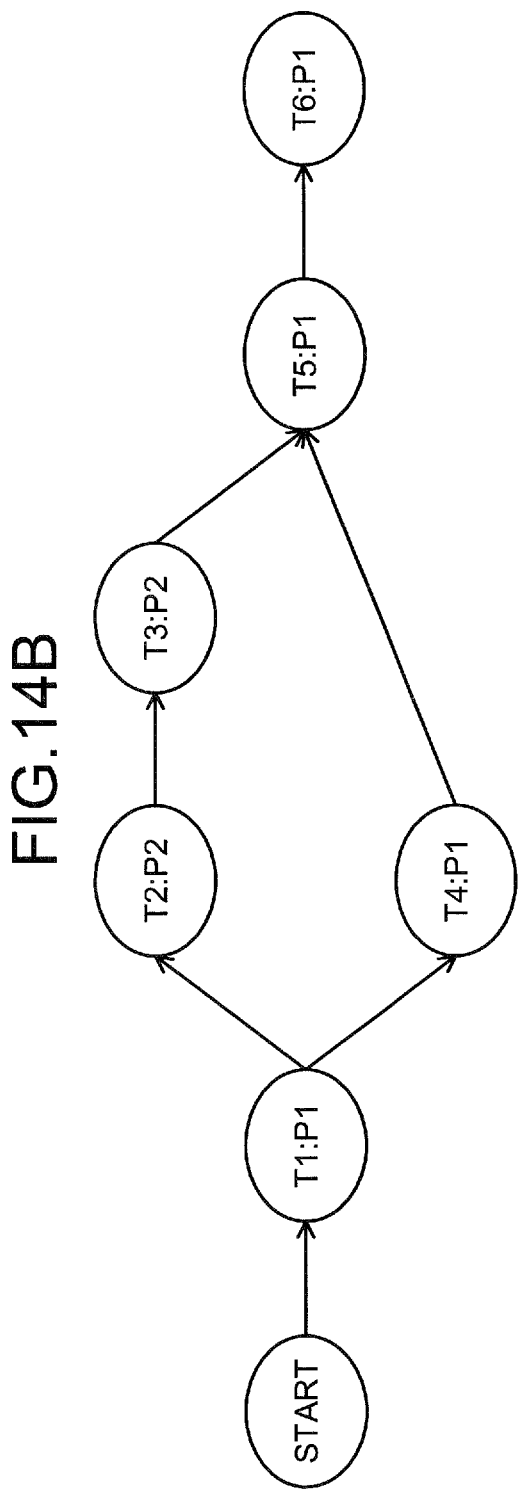
FIG. 14B is an explanatory diagram of dependency relations between tasks.

FIG. 14B is an explanatory diagram of the dependency relation between tasks. The task T1 is executed at the start of cooking. The tasks T2 and T4 branch in their dependency relation with the task T1 and can be executed simultaneously, but must be executed after the end of the task T1 according to the dependency relation. The task T3 is executed after execution of the task T2 because of the dependency relation between the tasks T3 and T2. The task T5 is executed after execution of the tasks T3 and T4 because of the dependency relation between the task T5 and the tasks T3 and T4. The task T6 is executed after execution of the task T5 because of the dependency relation between the tasks T6 and T5.

This means that if the task T3 "pan-fry onions" and the task T4 "grind meat into minced-meat" are not finished, the task T5 "mix the ingredients and shape into hamburger steaks" cannot be executed because of the cooking procedure. Such a task dependency relation is stored as a task selection rule, which will be described later, in the task selection rule storing unit 213. In FIG. 14B, P1 and P2 denote priority levels.

FIG. 15 is a table of an example of data collected from the terminal or peripheral device. This table indicates an example of measurement data transmitted from the terminal built-in sensor 112 of the terminal 102 or the device built-in sensor 114 of the peripheral device 103. Measurement data 1500 of FIG. 15 is collected using, as the device built-in sensor 114, a temperature sensor of a cooking instrument (portable cooking stove, pot, fry pan, etc.), which is the peripheral device 103. The sensor/terminal information aggregating unit 232 of the terminal 102 collects measurements of the temperature sensor and uses the measurements for generating context information.

The example of FIG. 15 indicates that a temperature detected by a sensor with a sensor ID 1 at a time "10:00:00" is "200.4° C.", and that a temperature detected later by the sensor with the sensor ID 1 at a time "10:00:01" is "200.6° C.".

FIG. 16 is a table of an example of generated context information. Context information 1600 of FIG. 16 uses information indicative of whether a cooking instrument has a high temperature or low temperature, as context. The context information 1600 is generated in such a way that, for example, the context generating unit 201 detects the presence of the user A in the kitchen (place) at a set time "10:00:15" and generates context information correlating the user A, the location, and the time with each other. The context generating unit 201 further detects the temperature of a stove 1 to be 180° C. or higher and the temperature of a stove 2 to be 200° C. or higher, as detailed information. As depicted in FIG. 16, the context generating unit 201 generates context information of multiple users.

FIG. 17 is table of an example of context acquisition control information. Context acquisition control information 1700 is stored in the context acquisition control information storing unit 211, and is made up of information of context granularity, context acquisition timing, etc. This example of the context acquisition control information 1700 indicates for the user A that acquired context is "temperature", acquisition timing is "meeting a condition", and a condition is "the temperature of the portable cooking stove 1 is 180° C. or higher". When the temperature of the cooking instrument reaches this temperature, the context generating unit 201 transmits temperature information as context, to the task managing unit 202.

FIG. 18 is a table of an example of a task selection rule. A task selection rule 1800 stored in the task selection rule storing unit 213 will be described. The task selection rule 1800 includes context conditions, priority levels, and dependency task IDs, for the above registered tasks. For example, a context condition "end of T1", a priority level "P2", and a dependency task ID "T1" are set for the task T2. In the column of the priority level, P1<P2 is satisfied.

FIG. 19 is a table of an example of a task/service correspondence relation. Task/service correspondence relation information 1900 stored in the task/service correspondence relation storing unit 221 will be described. The task/service correspondence relation information 1900 correlates a service of the peripheral device 103 (cooking instrument) necessary for executing a task, with each task. For example, a service for the task T2 is "vegetable cutter service", which corresponds to the task T2 "cut onions into small pieces" among the registered tasks (see FIG. 14A).

Figures 20, 21A, 21B:
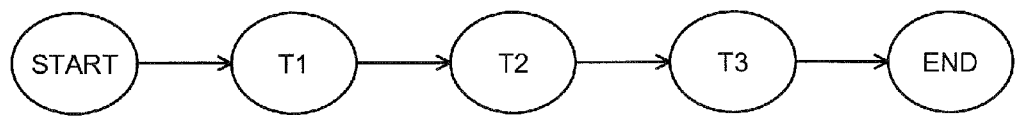
FIG. 20 is a table of an example of device/service definition information.
FIG. 21A is a table of an example of a task selection rule.
FIG. 21B is an explanatory diagram of the dependency relations between tasks.

FIG. 20 is a table of an example of device/service definition information. Device/service definition information 2000 stored in the device/service definition information storing unit 227 will be described. The device/service definition information 2000 correlates with each cooking instrument, a service provided by a cooking instrument, which is the peripheral device 103. For example, a service provided by a "vegetable cutter", i.e., a device (controlled unit 113), is "vegetable cutter service".

A procedure of execution of a task (cooking) based on the above setting contents will be described. Following the task selection rule 1800, the task managing unit 202 first selects and executes the task T1 ("prepare ingredients") for which the context condition is "NULL". At this time, although a service corresponding to the task T1 is indicated as "NULL", a message telling the user which ingredient is needed is displayed on the user's terminal 102.

The service managing unit 203 gives notification of the end of the task T1 executed by the peripheral device 103 to the task managing unit 202 via the terminal 102. As a result, the task managing unit 202 selects and executes the task T2 ("cut onions into tiny pieces") for which the context condition is the end of the task T1 and the priority level is high. In executing the task T2, the task controller executing unit 234 uses the "vegetable cutter service" provided by the "vegetable cutter", which is the peripheral device 103.

When the service managing unit 203 gives notification of the end of the task T2 to the task managing unit 202, if a context condition "end of T2 && portable cooking stove 1. temperature ≧180° C." is met, the task managing unit 202 selects and executes the task T3 ("pan-fry onions") whose priority level is P2. If the context condition is not met, the task T4 "grind meat into minced meat" may be executed first. In executing the task T3, the task controller executing unit 234 uses a "device temperature adjusting service" and a "timer service" provided by the "portable cooking stove 1", which is the peripheral device 103.

If the task T4 "grind meat into minced meat" has not been executed yet, the task managing unit 202 executes the task T4. In executing the task T4, the task controller executing unit 234 uses a "meat grinder service" provided by a "grinder", which is the peripheral device 103.

When the service managing unit 203 gives notification of the end of the tasks T3 and T4 to the task managing unit 202, the task managing unit 202 executes the task T5 "mix the ingredients and shape into hamburger steaks" for which the context condition is the end of the tasks T3 and T4. In executing the task T5, the task controller executing unit 234 uses an "ingredient mixer service" provided by a "mixer", which is the peripheral device 103.

When the service managing unit 203 gives notification of the end of the task T5 to the task managing unit 202, the task managing unit 202 selects and executes the task T6 "bake the ingredients" for which the context condition is the end of the tasks T5. In executing the task T6, the task controller executing unit 234 uses a "device temperature adjusting service" and a "timer service" provided by the "portable cooking stove 2", which is the peripheral device 103.

As described above, for multiple cooking functions of the peripheral devices, the order of execution of multiple tasks is managed to execute the tasks in the managed order. This allows the user to perform cooking skillfully and efficiently. Based on the dependency relation between tasks and priority levels given to the tasks, the user can avoid making an error in the cooking procedure and properly execute a necessary cooking operation on a case by case basis.

An example will be described, in which example the user is provided with support for car repair work by using only the terminal 102 without use of the peripheral device 103. In this example, "place" is irrelevant, so that context concerning place is not used. A repair procedure is displayed on the display unit of the terminal 102 by a Web browser.

Repair work described below is composed of multiple repair steps, each of which corresponds to a task. The worker performs repair work according to repair procedures displayed sequentially in synchronization with the proceeding of the repair work. Repair procedures are indicated, for example, as "detach screws from a place A and a place B to remove a part C", etc. In this example, no branching occurs in the dependency relation between tasks because the tasks are arranged in series in a time-dependent sequence.

The outline of the repair work is as follows. 1. First, the server 101 transmits the URL of a content describing work procedures, to the terminal 102. 2. Receiving the URL, the terminal 102 starts a browser and transmits the URL to the browser. 3. At the terminal 102, the browser accesses the specified URL to display the content describing work procedures. 4. The worker performs repair work according to the displayed content. 5. When one repair step is completed, the worker manipulates a "work completion button" on the browser of the terminal 102. 6. The server 101 receives a transmission of work completion from the terminal 102, and transmits the URL of a content describing the next repair step to the terminal 102. Thereafter, the server 101 repeats the processes of 4. to 6. for the terminal 102 until all repair steps are completed.

The dependency relation between tasks will be described. A case of car repair work is assumed, in which a worker A performs the repair work, which starts at 13:30. The repair work consists of three repair steps (tasks) representing tasks T1, T2, and T3. These tasks must be executed in order. In a case of oil replacement, the tasks consist of the task T1 "get rid of used oil", the task T2 "clean the engine interior", and the task T3 "inject new oil".

FIG. 21A is a table of an example of a task selection rule. For the worker A, a task selection rule 2100 stored in the task selection rule storing unit 213, for example, sets a context condition "end of T1", a priority level "5", and a dependency task ID "T1", for the task T2. A priority level having a higher numerical value represents a higher priority level. In the example of FIG. 21A, however, all priority levels are same.

FIG. 21B is an explanatory diagram of the dependency relation between tasks. The task T1 is executed at the start of the repair work, and the task T2 is executed after the end of the task T1 because of their dependency relation. The task T3 is executed following execution of the task T2 because of their dependency relation.

FIG. 22 is a table of an example of a task/service correspondence relation. As depicted in FIG. 22, according to the task/service correspondence relation information 2200 stored in the task/service correspondence relation storing unit 221, no service information entry is included (NULL entries are included) in the task/service correspondence relation information 2200 because a service provided by the peripheral device 103 is not used for execution of a task in this case. In other cases, when no service of the peripheral device 103 is used, task ID entries of T1 to T3 may be omitted from the task/service correspondence relation information 2200. If no task ID entry is included in the task/service correspondence relation information 2200, the task/service checking unit 224 determines that no service of the peripheral device 103 is used.

FIG. 23 is a table of an example of context acquisition control information. The context acquisition control information 2300 is stored in the context acquisition control information storing unit 211, and includes information concerning the granularity, acquisition timing, etc. of context. In this example of the context acquisition control information 2300, acquired context "time", acquisition timing "meeting a condition", and a condition "13:30" are set for the worker A, i.e., the user. When the above time "13:30" arrives, the context generating unit 201 transmits time information as context, to the task managing unit 202.

FIG. 24 is a table of an example of additional information of registered tasks. Additional information of tasks will be described referring to FIG. 24. In this example, when the server 101 makes a task start request to the terminal 102, the server 101 transmits the URL of content describing car repair work to the terminal 102. In the registered task storing unit 212, task IDs and URLs as task-related information are stored as task information 2400 of FIG. 24.

Additional information (URL) transmitted to the terminal 102 is managed in the following ways.
1. The context generating unit 201 manages the additional information. In this case, the task managing unit 202 receives task-related information from the context generating unit 201 and sends the received information directly to the terminal 102.
2. The context generating unit 201 defines the application 235 that receives a task start request, and the application 235 manages the additional information (URL). In this case, the application 235 transmits the task start request accompanying task-related information to the task managing unit 202. The task managing unit 202 sends the incoming task-related information from the application 235 directly to the terminal 102.

A procedure of execution of a task (car repair work) based on the above setting contents will be described.
1. When the task managing unit 202 recognizes the need to start a task Tx, the task managing unit 202 transmits a task start request message to the terminal 102. The task start request message includes an ordinary Web browser (installed in advance in the terminal 102) as the application 235 to start and a URL to be accessed by the Web browser.
2. Upon receiving the task start request message, the terminal 102 starts the Web browser, delivers the URL transmitted from the server 101, to the Web browser, and accesses the URL.
3. As the result of 2. of the procedure, the contents corresponding to the URL is displayed on the display unit of the terminal 102. This content is information necessary for executing the tasks T1 to T3 according to the type of a car to be repaired. For example, the content indicating an oil replacement procedure for the car to be repaired (first remove a bolt B from a point A, etc.) is displayed.
4. The worker performs repair work corresponding to a task while viewing the content displayed on the terminal 102, and when one task (repair step) is completed, manipulates the "work completion" button displayed on the display unit of the terminal 102.

5. As a result of manipulation of the button, the terminal 102 transmits a message of the completion of the task Tx to the task managing unit 202.

6. The task managing unit 202 gives notification of the completion of the task Tx to the context generating unit 201. Hence, the context generating unit 201 updates context of the worker. This shifts the state of the worker to a "task Tx completion" state.

7. In response to the update of the context, the server 101 starts control for the start of a new task through the task selecting unit 214. The server 101 thus returns to 1. to execute a process for the next task.

Figure 25:
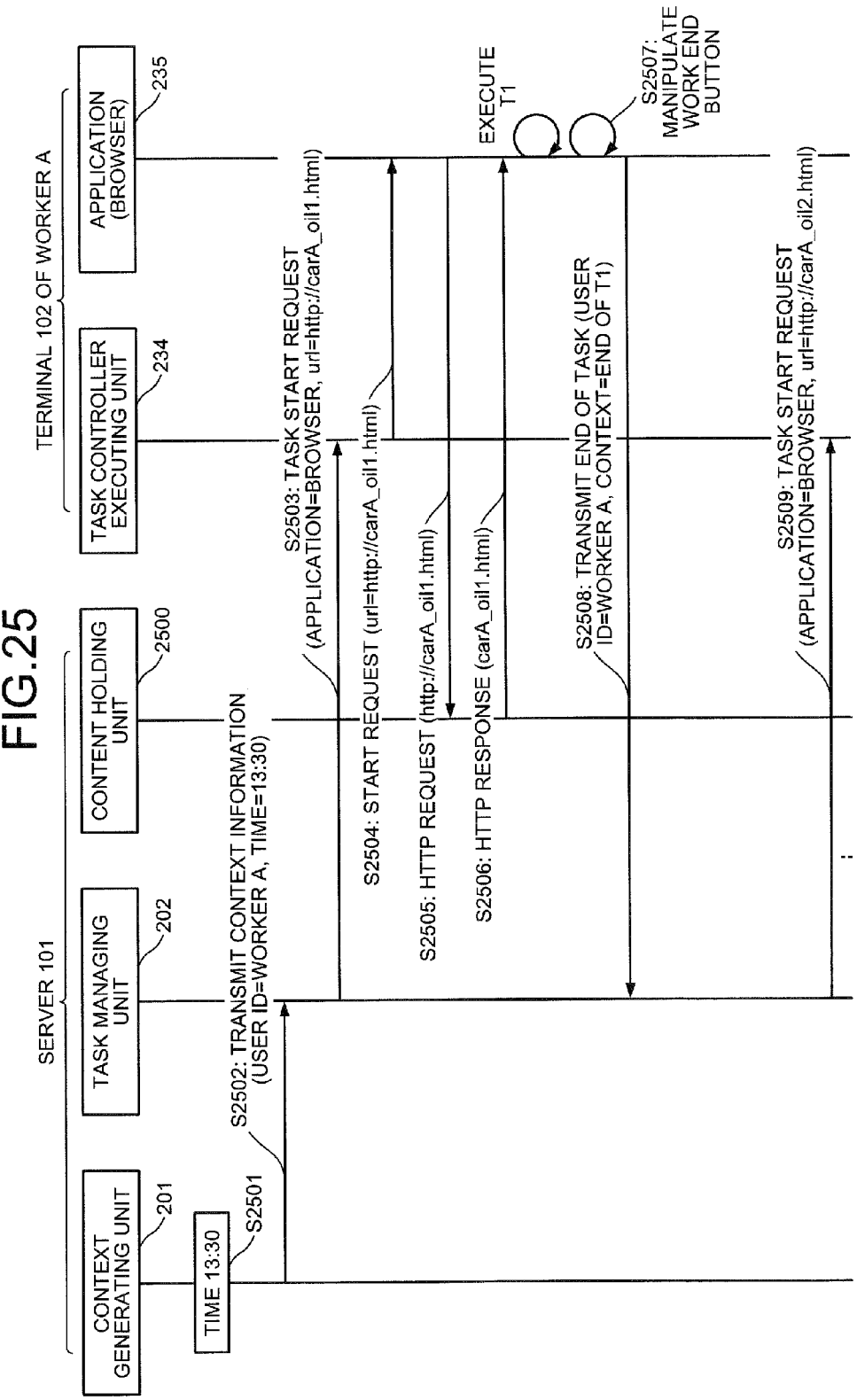
FIG. 25 is a sequence diagram of a task execution procedure.

FIG. 25 is a sequence diagram of a task execution procedure. A content holding unit 2500 depicted in FIG. 25 is included in the context generating unit 201, and holds the contents designated by a URL. First, the context generating unit 201 of the server 101 detects a time "13:30" (step S2501), and transmits context information to the task managing unit 202 (step S2502). This context information indicates that the user ID is the worker A and that the present time is "13:30". The task managing unit 202 receives the context information and makes a task start request to the terminal 102 of the worker A (step S2503). This task start request indicates a browser as the application 235 and a URL to access as the URL of the task T1 depicted in FIG. 24 (http://carA_oil1.html).

At the terminal 102, the task controller executing unit 234 receives the task start request and makes a start request to the browser, which is the application 235 (step S2504). This start request includes the URL of the task T1 (http://carA_oil1.html).

Based on the start request, the terminal 102 makes an HTTP request for content display to the content holding unit 2500 of the server 101 (step S2505). The HTTP request includes the above URL address, and the content holding unit 2500 sends an HTTP response back to the browser 235 of the terminal 102 (step S2506). As a result, the terminal 102 causes the Web screen to appear on the display unit, where the Web screen exhibits the repair step of the task T1. This allows the user to easily execute one repair step of the task T1 while viewing the screen on the display unit.

Thereafter, upon completing the repair step of the task T1, the worker A manipulates the "work end" button displayed on the display unit of the terminal 102 (step S2507). The browser 235 then transmits a task end message to the task managing unit 202 of the server 101 (step S2508). This task end message includes the user ID as the worker A and context as the end of the task T1.

Receiving the task end message, the task managing unit 202 selects the task T2 that is to be executed following the end of the task T1 because of the dependency relation with the task T1, as a task to execute next, and makes a task start request to the terminal 102 of the worker A (step S2509). Subsequently, the same process above is performed on the task T3.

According to the specific examples described above, in addition to task execution using the peripheral device, task execution using the terminal is also possible. The above car repair work can be performed skillfully and efficiently at each step of the work by managing the order of execution of multiple tasks and executing the task in order. Information necessary at each repair step is displayed on the screen of the display unit of the terminal. As a result, the user does not make an error in identifying the location of repair work or a part to repair and can complete repair work by switching between screens to browse necessary information.

According to the first embodiment, based on context of the user and the user's surrounding environment and on a service provided by the peripheral device, multiple tasks can be executed in order of priority and the dependency relation between tasks are taken into consideration. This suppresses the user's error in work and drops in work efficiency. In addition, context processing is distinguished clearly from task processing. As a result, an algorithm for the context processing can be changed easily without exerting any effect on the task processing. This facilitates system development.

A second embodiment relates to a configuration in which a new task interrupts causing suspension of a task under execution. Interruption by a task occurs when, for example, a user is suddenly forced to process a new job while executing a routine job. In this embodiment, a interrupt process and a suspension process are executed by respective users.

Figure 26:
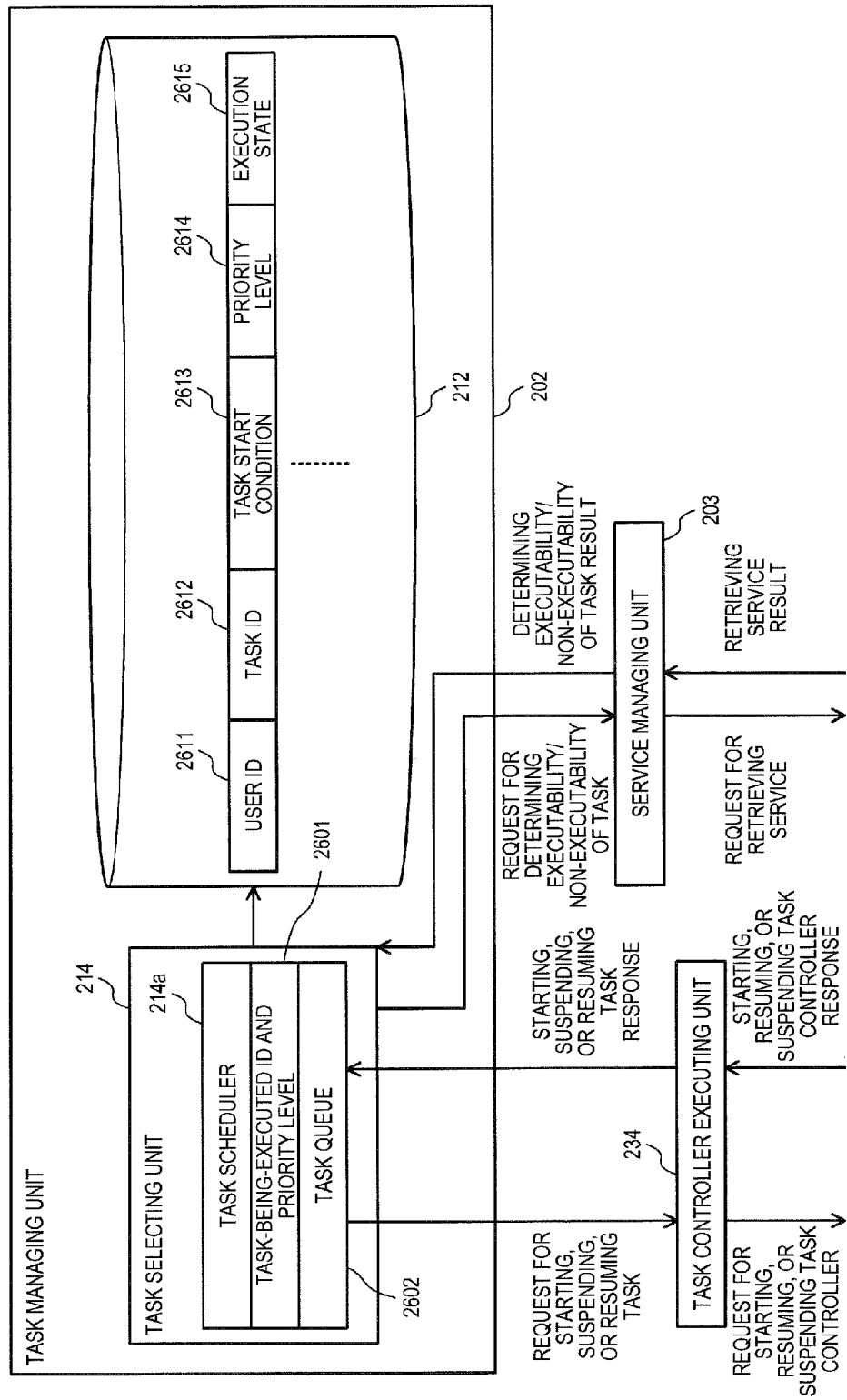
FIG. 26 depicts a configuration of a task execution control system according to a second embodiment.

FIG. 26 depicts a configuration of a task execution control system according to the second embodiment. In FIG. 26, constitute elements different from the constitute elements of the first embodiment are extracted and depicted, and constitute elements other than the extracted constitute elements are substantially the same as the constitute elements of the first embodiment (FIG. 2) but are different in the following aspects. In the context generating unit 201, each context condition that must be met to start each task is entered. Based on the context condition, the context generating unit 201 determines the presence/absence of a task that can be started, and when a task that can be started is present, transmits information of the task to the task selecting unit 214. At the terminal, every process supposed to be executed by each task, such as control of the peripheral device 103 and the terminal screen, is executed by the application 235. Hereinafter, the application 235 is referred to as a task controller. The task controller executing unit 234 serves as a unit that performs common control over the task controller, such as the start, suspension, and resumption of the task controller. The constituent elements different from the constituent elements of the first embodiment will be described.

The task selecting unit 214 of the task managing unit 202 makes a request for starting, suspending, or resuming task execution, to the task controller executing unit 234 of the terminal 102, and receives a response of starting, suspending, or resuming task execution. The task scheduler 214*a* incorporated in the task selecting unit 214 receives context information for each user from the context generating unit 201, and manages information concerning one or more tasks in a stand-by state and tasks being executed (task queue).

The task scheduler 214*a* manages the ID and priority level of a task under execution (task information of 0 or 1 tasks) as task under execution 2601 and the ID and priority level of a task in a stand-by state (task information of 0 or more tasks), using a task queue 2602. The task scheduler 214*a* manages tasks that can be executed by the terminal 102, based on a list of task IDs and task priority levels.

The registered task storing unit 212 stores information of user ID 2611, task ID 2612, task start condition 2613, priority level 2614, and execution state 2615 in the form of a table. User ID 2611 represents the ID of a user who is to execute a task. If a user who is to execute the task is not specified, an ID indicative of no user being specified (e.g., 0) is stored as the user ID 2611. Task ID 2612 represents the identifier (ID) of a task. Task start condition 2613 represents a condition for starting a task. Priority level 2614 represents the priority level of a task. Execution state 2615 represents the execution state of a task (not executed, completed).

The task controller executing unit 234 of the terminal 102 controls the start, suspension, and resumption of the task controller by following an instruction from the task scheduler 214a of the server 101. The task controller executing unit 234 also performs control for installing and uninstalling the task controller.

Figure 27:
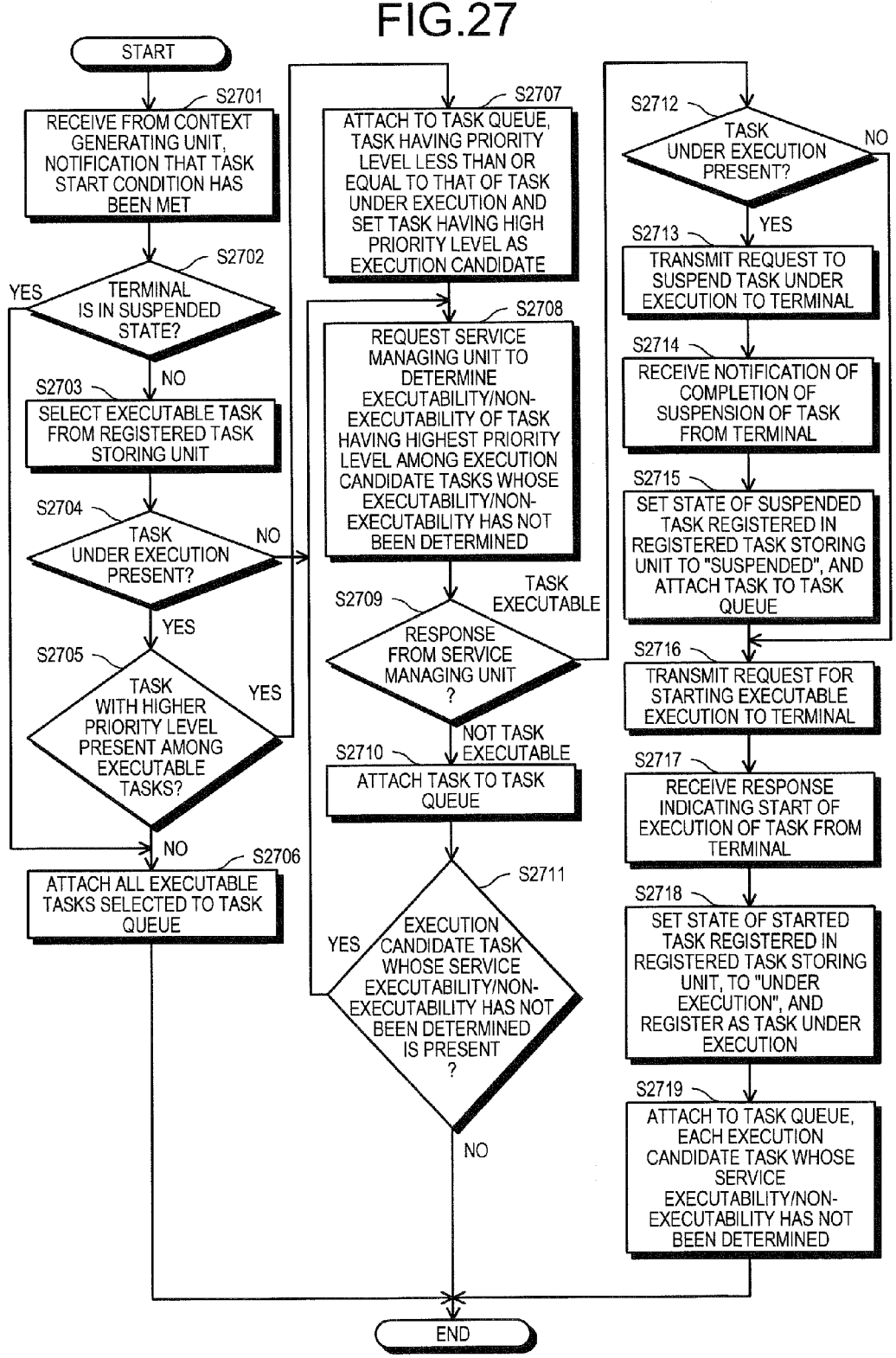
FIG. 27 is a flowchart of a process by the task managing unit.

FIG. 27 is a flowchart of a process by the task managing unit. A process example will be described, in which the task scheduler 214a executes a task based on notification from the context generating unit 201. The task scheduler 214a receives from the context generating unit 201, notification that a task start condition has been met (step S2701). The task scheduler 214a determines whether the terminal 102 is in a suspended state (step S2702). If the terminal 102 is in a suspended state (step S2702: YES), the task scheduler 214a proceeds to step S2706. If the terminal 102 is not in a suspended state (step S2702: NO), the task scheduler 214a proceeds to step S2703. The task scheduler 214a determines that the terminal 102 is in the suspended state if a terminal suspension flag is set, and determines that the terminal 102 is not in the suspended state if the flag is not set.

At step S2703, the task scheduler 214a selects an executable task from the registered task storing unit 212. The task scheduler 214a then determines whether a task under execution at the terminal 102 is present (step S2704). If a task under execution is present (step S2704: YES), the task scheduler 214a proceeds to step S2705. If no task under execution is present (step S2704: NO), the task scheduler 214a proceeds to step S2708.

At step S2705, the task scheduler 214a determines whether a task with a priority level higher than that of a task under execution at the terminal 102 is present among the executable tasks selected at step S2703. If a task with the higher priority level is present (step S2705: YES), the task scheduler 214a proceeds to step S2707. If no task with the higher priority level is present (step S2705: NO), the task scheduler 214a proceeds to step S2706.

At step S2706, the task scheduler 214a attaches all executable tasks selected at step S2703 to the task queue 2602, and ends the entire process. The task queue 2602 manages tasks not executed at the terminal 102 (including a suspended task) among tasks for which the context generating unit 201 determined that start conditions have been met.

At step S2707, among the executable tasks selected at step S2703, the task scheduler 214a attaches to the task queue 2602, a task having a priority level less than or equal to that of a task under execution at the terminal 102. A task having a high priority level that is not attached to the task queue 2602 is determined to be an execution candidate task.

At step S2708, the task scheduler 214a makes a request to the service managing unit 203, for determining the executability/non-executability of a task having the highest priority level among execution candidate tasks whose executability/non-executability has not been determined. If no service of the peripheral device 103 is used at the execution of a task, the task is executed immediately. At step S2709, if the response (from the service managing unit 203) to the request made at step S2708 indicates a determination result that the task is executable (step S2709: task executable), the task scheduler 214a proceeds to step S2712. If the response indicates that the task is not executable (step S2709: task not executable), the task scheduler 214a proceeds to step S2710.

At step S2710, the task scheduler 214a attaches to the task queue 2602, a task that has been determined to not be executable as a result of the determination of the service executability/non-executability. At step S2711, the task scheduler 214a determines whether an execution candidate task whose service executability/non-executability has not been determined is present. If such an execution candidate task is present (step S2711: YES), the task scheduler 214a proceeds to step S2708. If such an execution candidate task is not present (step S2711: NO), the task scheduler 214a ends the entire process.

At step S2712, the task scheduler 214a determines whether a task under execution at the terminal 102 is present. If the task under execution is present (step S2712: YES), the task scheduler 214a proceeds to step S2713. If no task under execution is present (step S2712: NO), the task scheduler 214a proceeds to step S2716. At step S2713, the task scheduler 214a transmits to the terminal 102, a request for suspending a task under execution. At step S2714, the task scheduler 214a receives from the terminal 102, notification of the completion of suspension of the task under execution. At step S2715, the task scheduler 214a updates the state of the completely suspended task registered in the registered task storing unit 212 to "suspended", and attaches the task to the task queue 2602.

At step S2716, the task scheduler 214a transmits to the terminal 102, a request for starting execution of a task determined to be executable at step S2709. At step S2717, the task scheduler 214a receives from the terminal 102, a response indicating start of execution of the task. At step S2718, the task scheduler 214a updates the state of the started task registered in the registered task storing unit 212, to "under execution", and handles this task as a task under execution. At step S2719, the task scheduler 214a attaches to the task queue 2602, each remaining execution candidate task whose service executability/non-executability has not been determined, and ends the entire process.

Figure 28:
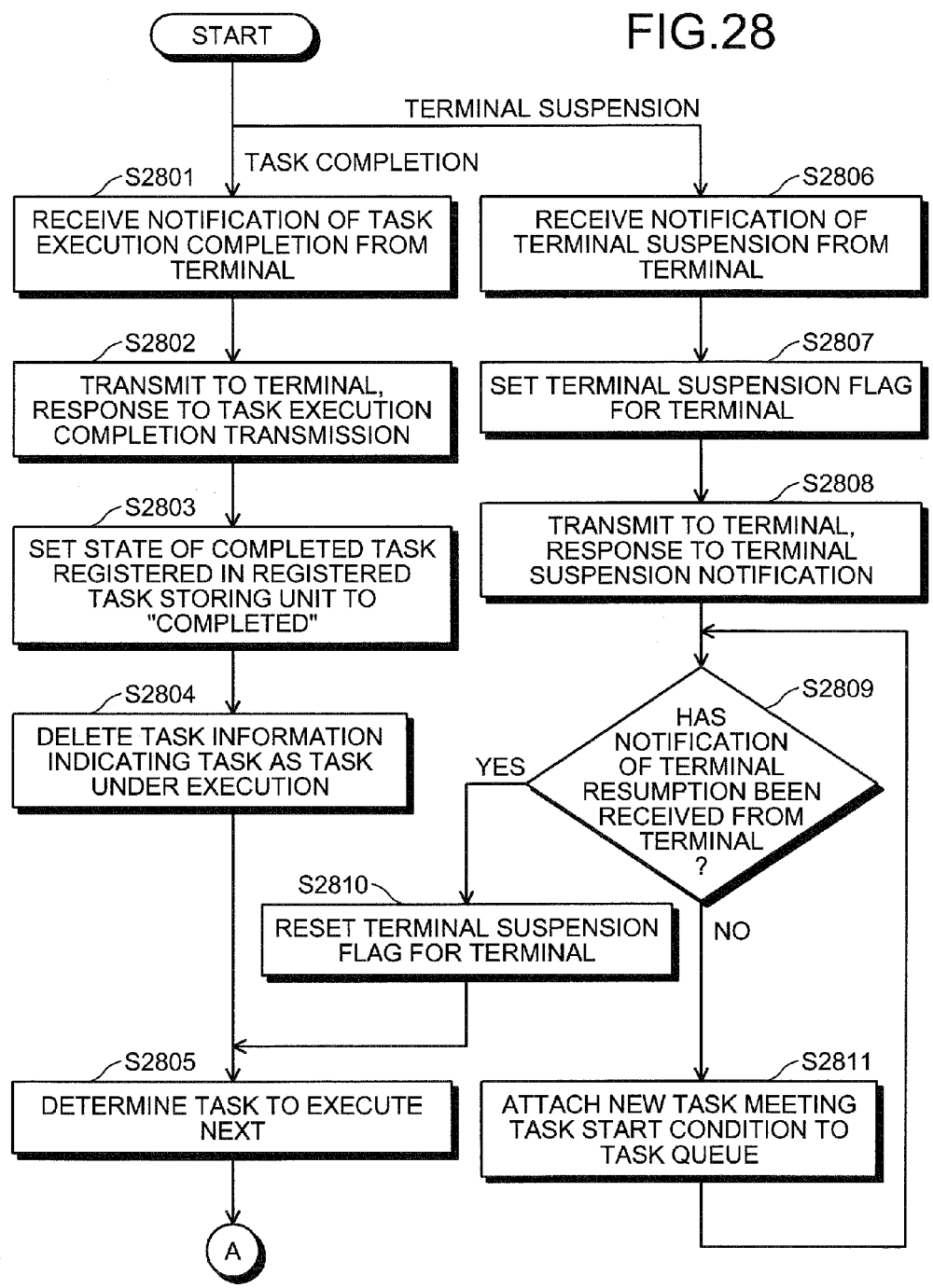
FIG. 28 is a flowchart of a process that is executed when a task ends at the task managing unit and the terminal is suspended.

FIG. 28 is a flowchart of a process that is executed when a task ends at the task managing unit and the terminal is suspended. The process executed in a case where a task under execution at the terminal 102 is ended and in a case where the terminal is suspended will be described. The terminal 102 is put in a suspended state when the user operates the terminal 102 under a certain situation to bring the terminal 102 into a state where the terminal 102 does not accept task control from the server 101.

In a case where the terminal 102 completes a task, the task scheduler 214a receives notification of task execution completion from the terminal 102 following the completion of the task executed at the terminal 102 (step S2801). The task scheduler 214a transmits to the terminal 102, a response to the task execution completion transmission (step S2802). The task scheduler 214a updates the state of the completed task registered in the registered task storing unit 212 to "completed" (step S2803), and deletes task information indicating this task as a task under execution (step S2804). The task scheduler 214a then proceeds to a process of determining a task to execute next (step S2805).

In a case where the terminal 102 is suspended, when the user performs an operation for suspending the terminal 102, the task scheduler 214a receives notification of terminal suspension from the terminal 102 (step S2806). The task scheduler 214a, therefore, sets a terminal suspension flag for the terminal 102 (step S2807). The task scheduler 214a then transmits to the terminal 102, a response to the terminal suspension notification (step S2808). The task scheduler 214a determines whether notification of terminal resumption has been received from the terminal 102 (step S2809). If notification of terminal resumption has been received (step S2809: YES), the task scheduler 214a resets the terminal suspension flag for the terminal 102 (step S2810), and proceeds to step S2805. If no notification of terminal resumption has been received (step S2809: NO), the task scheduler 214a attaches a new task meeting a task start condition to the task queue 2602 (step S2811), and returns to step S2809.

FIGS. 29A and 29B are flowcharts of a process by the task managing unit of checking a service for a task standing by for execution. A process of periodically checking the presence/absence of a service necessary for execution of a task standing by in the task queue will be described. Some of steps depicted in FIG. 29 are executed in the same manner when a task under execution at the terminal 102 is ended.

The task scheduler 214a determines whether the terminal 102 is in a suspended state (step S2901). If the terminal 102 is in a suspended state (step S2901: YES), the task scheduler 214a proceeds to step S2904. If the terminal 102 is not in a suspended state (step S2901: NO), the task scheduler 214a determines whether a task under execution at the terminal 102 is present (step S2902). If task under execution is present (step S2902: YES), the task scheduler 214a proceeds to step S2903. If the task under execution is not present (step S2902: NO), the task scheduler 214a proceeds to step S2905.

At step S2903, the task scheduler 214a determines whether a task having a priority level higher than that of a task under execution at the terminal 102 is present among tasks in the task queue 2602. If task having a higher priority level is present (step S2903: YES), the task scheduler 214a proceeds to step S2906. If no task having a higher priority level is present (step S2903: NO), the task scheduler 214a stands by for a fixed period (step S2904) and ends the process (after which the process is restarted from step S2901). The fixed period may be changed dynamically depending on the priority levels of tasks in the task queue 2602. For example, the period may be determined to be shorter when the priority levels are higher, or may be changed for each task.

At step S2905, the task scheduler 214a selects all tasks in the task queue 2602 as execution candidate tasks, and proceeds to step S2907. At step S2906, the task scheduler 214a selects (a set of) tasks having priority levels higher than that of a task under execution at the terminal 102, as execution candidate tasks, and proceeds to step S2907.

At step S2907, the task scheduler 214a checks with the context generating unit 201 on whether an execution condition for a task with the highest priority among execution candidate tasks of which executability/non-executability is not determined is met. This means that whether a candidate task can be executed (resumed) under the current context is checked. Based on the result of the check at step S2907, the task scheduler 214a determines whether execution of this task is possible (step S2908). If execution of the task is impossible (step S2908: NO), the task scheduler 214a proceeds to step S2909. If execution of the task is possible (step S2908: YES), the task scheduler 214a proceeds to step S2910.

At step S2909, for a task for which a task start condition is not met because of a change in context, the task scheduler 214a resets a task start condition on the context generating unit 201. The task scheduler 214a detaches the task from the task queue 2602, and proceeds to step S2919.

At step S2910, the task scheduler 214a transmits to the service managing unit 203, a request to determine the executability/non-executability of a task and receives a response from the service managing unit 203. If the response indicates that the task is executable (step S2911: executable), the task scheduler 214a proceeds to step S2912. If the response indicates that the task is not executable (step S2911: not executable), the task scheduler 214a proceeds to step S2919.

At step S2912, the task scheduler 214a determines whether a task is under execution at the terminal 102. If a task is under execution (step S2912: YES), the task scheduler 214a proceeds to step S2913. If no task is under execution (step S2912: NO), the task scheduler 214a proceeds to step S2916.

At step S2913, the task scheduler 214a transmits to the terminal 102, a request to suspend the task under execution. The task scheduler 214a receives from the terminal 102, notification of completion of suspension of the task under execution (step S2914). The task scheduler 214a updates the state of the completely suspended task registered in the registered task storing unit 212 to "suspended", and attaches the task to the task queue 2602 (step S2915). The task scheduler 214a then transmits to the terminal 102, a request to start execution of a task determined to be executable at step S2911 (step S2916). If the task determined to be executable is in a "suspended" state, the task scheduler 214a transmits a request to resume the task to the terminal 102.

The task scheduler 214a receives from the terminal 102, a response indicating start of execution of the task (step S2917). At step S2916, after transmitting a request to resume the task, the task scheduler 214a receives from the terminal 102, a response indicating resumption of the task. The task scheduler 214a then updates the state of the started task registered in the registered task storing unit 212, to "under execution". The task scheduler 214a handles this task as a task under execution (step S2918), and proceeds to step S2904.

At step S2919, the task scheduler 214a regards a task for which the executability/non-executability is determined, as a determined task. The task scheduler 214a determines whether an execution candidate task for which the executability/non-executability has not been determined is present (step S2920). If an execution candidate task for which the executability/non-executability has not been determined is present (step S2920: YES), the task scheduler 214a proceeds to step S2907. If no execution candidate task for which the executability/non-executability has not been determined is present (step S2920: NO), the task scheduler 214a proceeds to step S2904.

Figure 30:
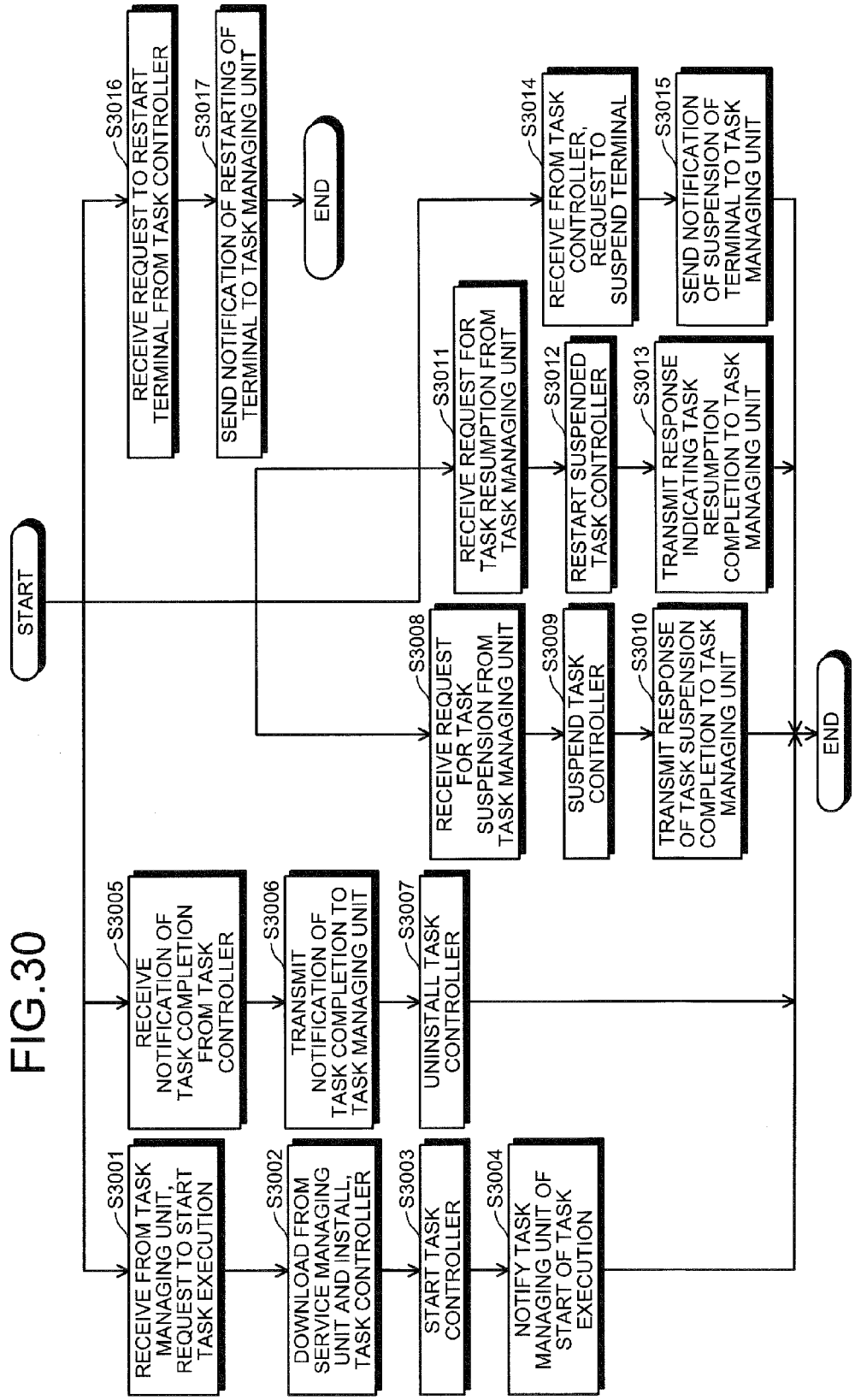
FIG. 30 is a flowchart of a process executed by the terminal.
Figure 31A:
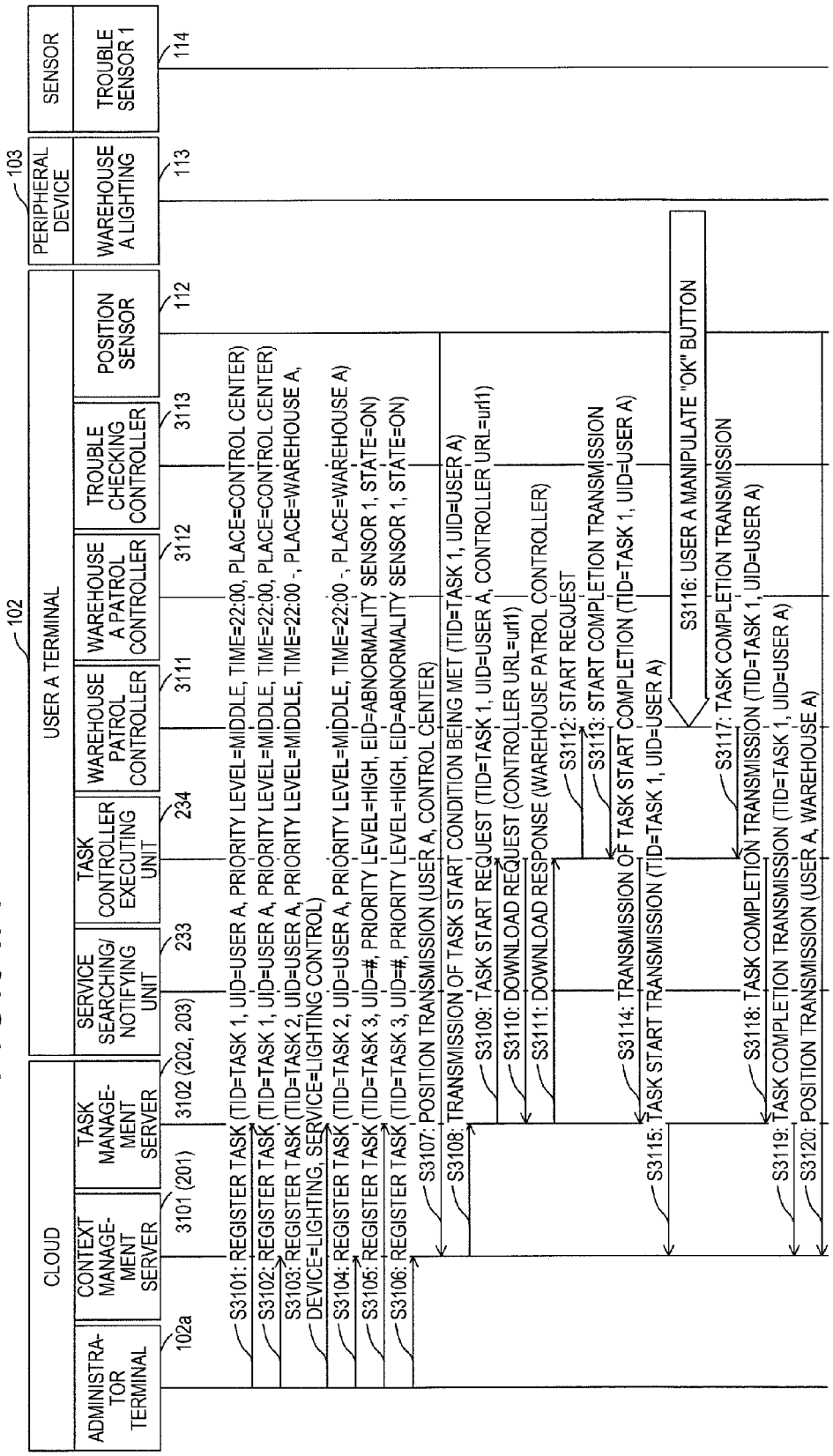
FIGS. 31A, 31B, 31C, and 31D are sequence diagrams of a procedure of executing a task.
Figure 31B:
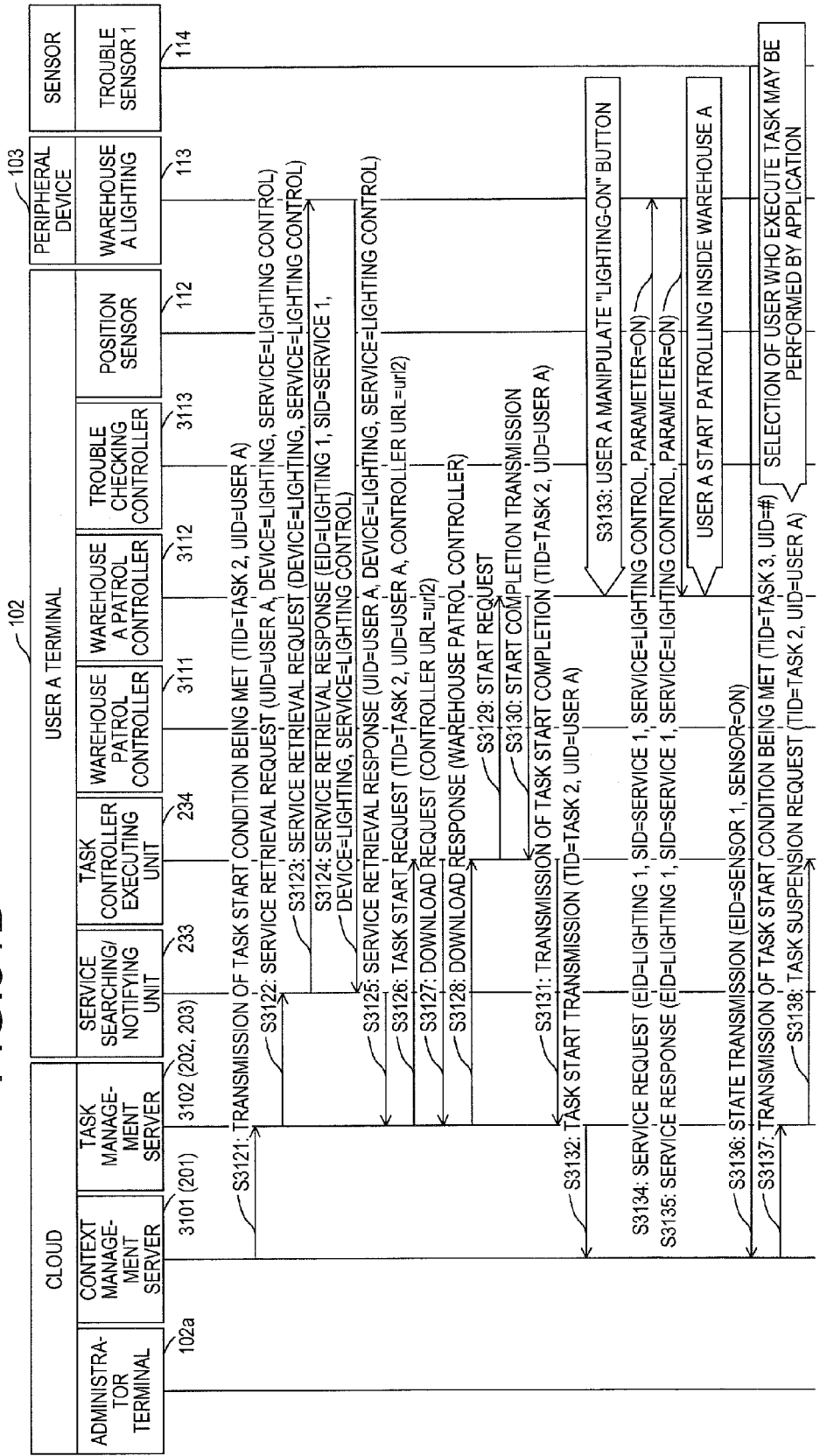
Figure 31C:
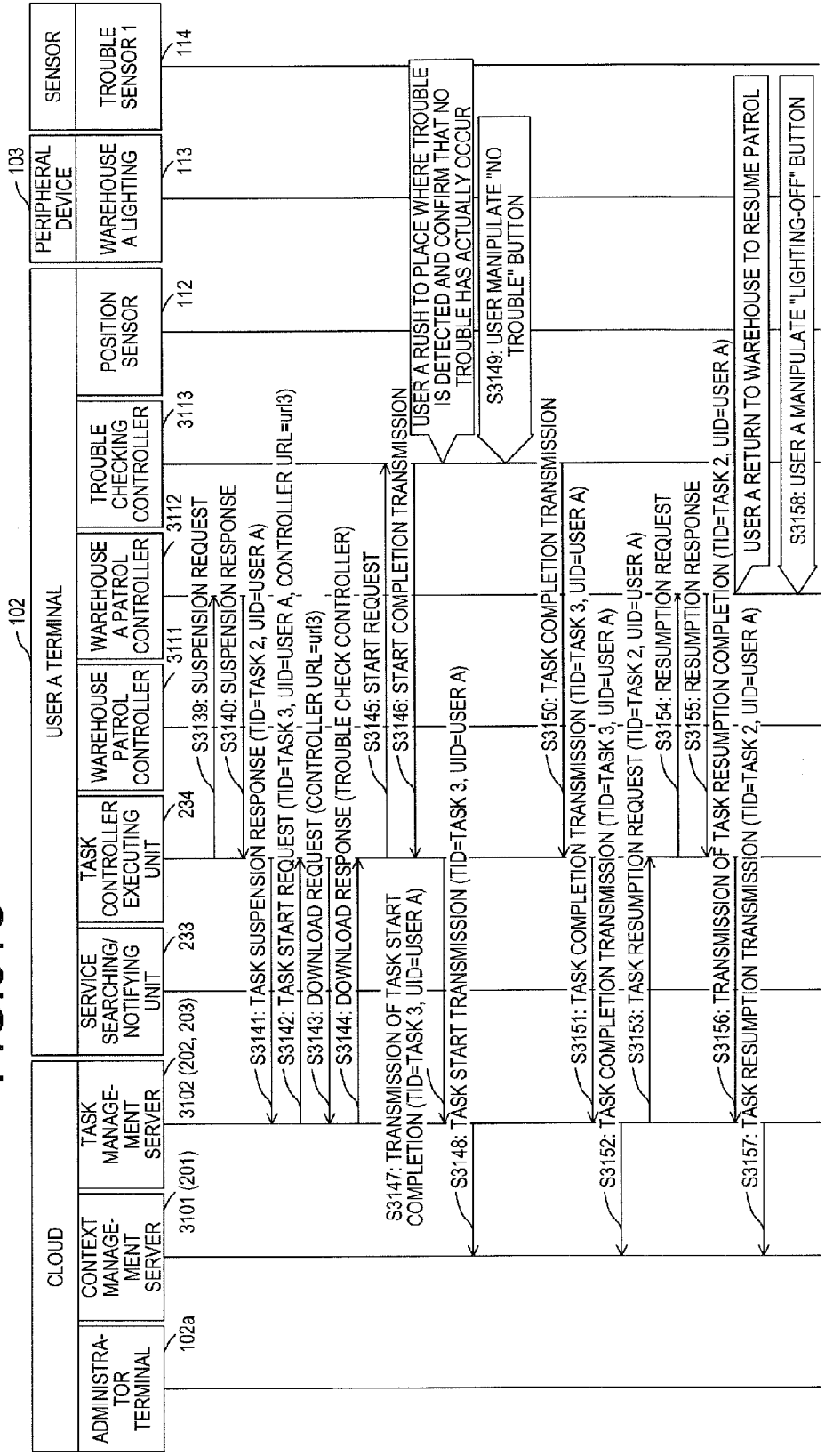
Figure 31D:
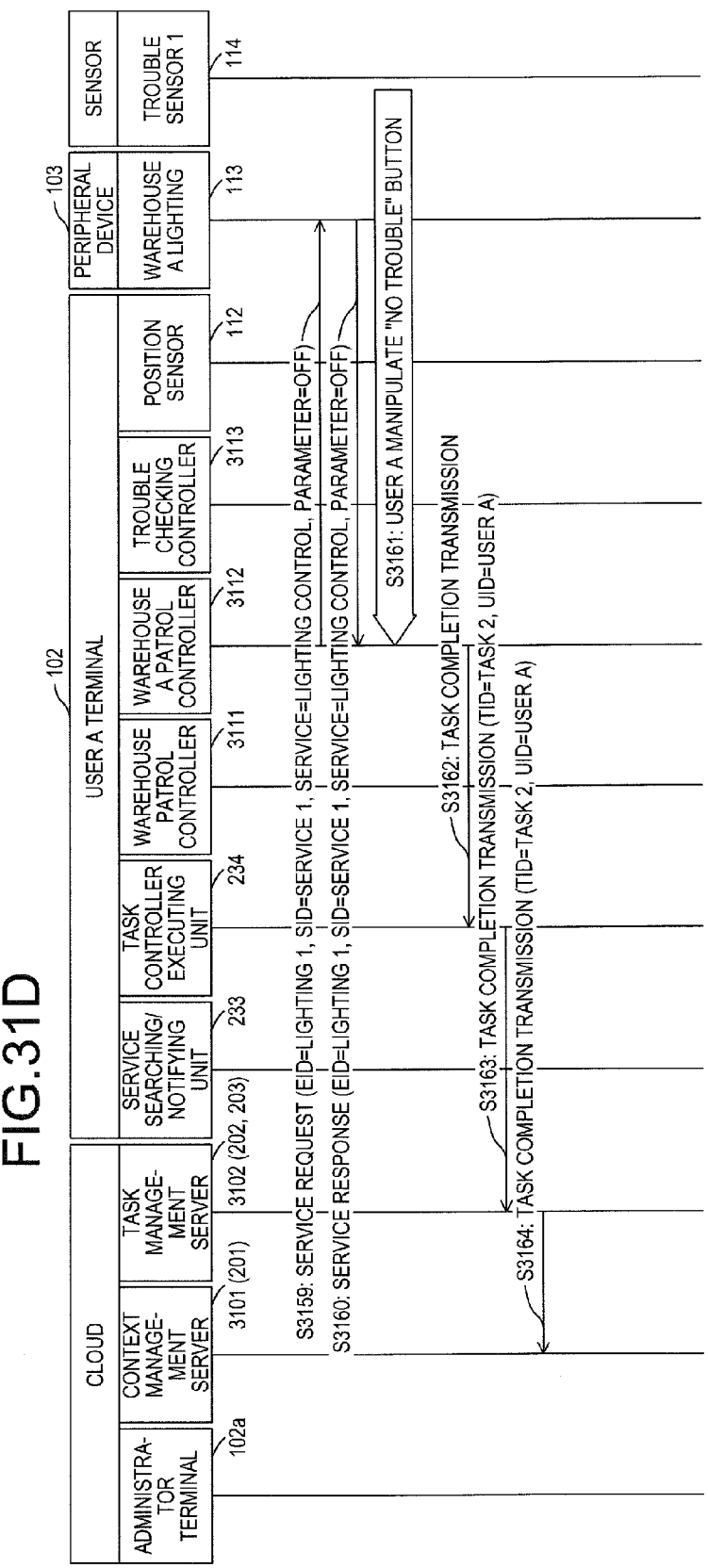

FIG. 30 is a flowchart of a process executed by the terminal. A process executed by the task controller executing unit 234 of the terminal 102 will be described. Any one of step S3001, step S3005, step S3008, step S3011, step S3014, and step S3016 described below starts in response to reception of a request or notification.

At step S3001, when the task controller executing unit 234 receives from the task managing unit 202 of the server 101, a request to start task execution (step S3001), the task controller executing unit 234 downloads a task controller from the service managing unit 203 and installs the task controller (step S3002). However, if a task controller needed for task execution is installed in advance in the terminal 102, this step is omitted. The task controller executing unit 234 starts the task controller (step S3003), transmits to the task managing unit 202, a response indicating start of task execution (step S3004), and ends the process.

At step S3005, when the task controller executing unit 234 receives notification of task completion from the task controller (step S3005), the task controller executing unit 234 transmits the notification of task completion to the task managing unit 202 (step S3006), uninstalls the task controller (step S3007), and ends the process. The step of uninstalling the task controller may be omitted when memory of the terminal 102 has surplus memory capacity of a given size.

At step S3008, when the task controller executing unit 234 receives a request for task suspension from the task managing unit 202, the task controller executing unit 234 suspends the task controller (step S3009), transmits a response of task suspension completion to the task managing unit 202 (step S3010), and ends the process.

At step S3011, when the task controller executing unit 234 receives a request for task resumption from the task managing unit 202, the task controller executing unit 234 restarts the suspended task controller (step S3012), transmits a response indicating task resumption completion to the task managing unit 202 (step S3013), and ends the process.

At step S3014, the task controller executing unit 234 receives from the task controller, a request to suspend the terminal. The user may issue an instruction to suspend the terminal directly to the task controller executing unit 234, by-passing the task controller. The task controller executing unit 234 then sends notification of suspension of the terminal to the task managing unit 202 (step S3015), and ends the process.

At step S3016, the task controller executing unit 234 receives a request to restart the terminal from the task controller. The user may issue an instruction to restart the terminal directly to the task controller executing unit 234, by-passing the task controller. The task controller executing unit 234 then sends notification of restarting of the terminal to the task managing unit 202 (step S3017), and ends the process.

When an exceptional case, such as a service necessary for executing a task becomes unusable because of a cut off of power supply to the peripheral device 103 or shift of the peripheral device 103, occurs during execution of a task, the task controller detects the occurrence of the exceptional case and sends notification of the occurrence of the exceptional case to the task controller executing unit 234. Receiving the notification, the task controller executing unit 234 sends the notification to the task managing unit 202. Subsequently, the task managing unit 202 suspends the task and then checks the presence of a different executable task. If a different executable task is found, the task managing unit 202 requests the terminal 102 to execute that task. This process for an exceptional case is similar to the process by the task managing unit 202 depicted in FIG. 27 and to the process by the controller executing unit 234 depicted in FIG. 30, and is therefore omitted in further description.

FIGS. 31A, 31B, 31C, and 31D are sequence diagrams of a procedure of executing a task. An example of a specific process of executing a task will be described referring to these sequence diagrams. The following example is an example of providing support for security patrol work. In the sequence diagrams, a context managing server 3101 is a server that includes the context generating unit 201, and a task managing server 3102 is a server including the task managing unit 202 and the service managing unit 203.

The user A carrying the terminal 102 makes patrol rounds. The terminal 102 has a position sensor as the terminal built-in sensor 112. Various methods of acquiring position information by the position sensor are available, such as a GPS or an RFID reader incorporated in the terminal 102 reading an RFID tag attached to a specific place. Controllers 3111 to 3113 are equivalent to task controllers downloaded from the task managing server 3102.

A setting process executed before the start of security patrol will first be described.
(Step S3101) Using the administrator terminal 102a, an administrator registers into the task managing server 3102, a warehouse patrol task to be executed by the user A who is at a control center at 22:00.
(Step S3102) The administrator registers the same task as the task at step S3101, into the context managing server 3101.
(Step S3103) The administrator registers a task of patrolling the warehouse A that is to be executed by the user A who is in the warehouse A after 22:00.
(Step S3104) The administrator registers into the context managing server 3101, the same task as the task at step S3103.
(Step S3105) The administrator registers a trouble check task that is to be executed when a trouble sensor 1 switches on.
(Step S3106) The administrator registers into the context managing server 3101, the same task as the task at step S3105.

A process executed when the user A makes a security patrol will be described.
(Step S3107) The position sensor 112 of the portable terminal 102 carried by the user A notifies the context managing server 3101 that the user A is in the control center.
(Step S3108) Recognizing that the user A is in the control center and the current time is 22:00, the context managing server 3101 transmits to the task managing server 3102, notification that a start condition for the warehouse patrol task registered at step S3102 is met.
(Step S3109) The task managing server 3102 transmits to the task controller executing unit 234 of the terminal 102, a request to start the warehouse patrol task registered at step S3101.
(Step S3110) The task controller executing unit 234 accesses a specified URL and makes a request for downloading the warehouse patrol controller 3111.
(Step S3111) The task managing server 3102 sends to the task controller executing unit 234, a response indicating downloading. As a result, the warehouse patrol controller 3111 is downloaded and installed in the terminal 102.
(Step S3112) The task controller executing unit 234 starts the downloaded warehouse patrol controller 3111.
(Step S3113) The started warehouse patrol controller 3111 transmits to the task controller executing unit 234, notification of the completion of start of the warehouse patrol controller 3111.
(Step S3114) The task controller executing unit 234 transmits to the task managing server 3102, notification of the completion of start of a task 1.
(Step S3115) The task managing server 3102 transmits the start of the task 1 to the context managing server 3101. The context managing server 3101 updates the state of the user A to "executing the task 1".
(Step S3116) The warehouse patrol controller 3111 displays the warehouse A on the screen, as information of a place to patrol. The user checks the screen and manipulates the "OK" button.
(Step S3117) Consequent to the "OK" button being manipulated, the warehouse patrol controller 3111 transmits notification of the completion of the task to the task controller executing unit 234, and ends the process.
(Step S3118) The task controller executing unit 234 transmits notification of the completion of the task 1 to the task managing server 3102.
(Step S3119) The task managing server 3102 transmits notification of the completion of the task 1 to the context managing server 3101. The context managing server 3101 updates the state of the user A to "idle".
(Step S3120) When the user A arrives at the warehouse A, which is the place to patrol, the position sensor 112 of the terminal 102 detects the user A to be at the warehouse A, and transmits to the context managing server 3101, notification indicating that the user A is at the warehouse A.
(Step S3121) Recognizing that the user A is in the warehouse A after 22:00, the context managing server 3101 transmits to the task managing server 3102, notification that a start condition for the warehouse A patrol task registered at step S3104 is met.

(Step S3122) Recognizing that a device and a service necessary for execution of the warehouse A patrol task are present, the task managing server 3102 makes a request for searching the device and service.

(Step S3123) The service searching/notifying unit 233 of the terminal 102 of the user A retrieves the device and service. For example, when the universal plug and play (UPnP) protocol is adopted, the service searching/notifying unit 233 multicasts an M-SEARCH message to the surroundings.

(Step S3124) When a lighting device 113 in the warehouse A receives the search message, the lighting device 113 transmits a search response because the lighting device 113 is the specified device and is capable of providing a lighting control service. While the lighting device 113 directly transmits a response indicating device/service information thereof in this example, the lighting device 113 may transmit a response indicating the URL of a file describing the device/service information of the lighting device 113. In such a case, the terminal 102 of the user A acquires the file from the device/service definition information storing unit 227, based on the URL, thereby acquires the device/service definition information.

(Step S3125) The service searching/notifying unit 233 transmits the result of service search to the task managing server 3102.

(Step S3126) When confirming that the device and service necessary for the warehouse A patrol task are present near the user A, the task managing server 3102 transmits a task start request to the task controller executing unit 234 of the terminal 102.

(Step S3127) The task controller executing unit 234 accesses the specified URL and makes a request for downloading the warehouse A patrol controller 3112.

(Step S3128) The warehouse A patrol controller 3112 is downloaded to the task controller executing unit 234 and is installed in the terminal 102.

(Step S3129) The task controller executing unit 234 starts the downloaded warehouse A patrol controller 3112.

(Step S3130) The started warehouse A patrol controller 3112 transmits notification of the completion of start of the warehouse A patrol controller 3112, to the task controller executing unit 234.

(Step S3131) The task controller executing unit 234 transmits notification the completion of start of a task 2, to the task managing server 3102.

(Step S3132) The task managing server 3102 transmits notification of the start of the task 2 to the context managing server 3101. The context managing server 3101 updates the state of the user A to "executing the task 2".

(Step S3133) The warehouse A patrol controller 3112 displays a lighting-ON button, a lighting-OFF button, a trouble-detection button, and a no trouble button for the warehouse A on the screen. The user manipulates the lighting-ON button.

(Step S3134) The warehouse A patrol controller 3112 requests the lighting device of the warehouse A retrieved at step S3122 to execute the lighting control service with a parameter ON.

(Step S3135) The lighting device 113 of the warehouse A executes the service requested at step S3131 (e.g., turns on the lighting) and then sends back a response of service execution. The user A starts patrolling the warehouse A.

(Step S3136) If a trouble sensor (114) installed in a building B detects trouble, the trouble sensor (114) transmits detection of the trouble to the context managing server 3101.

(Step S3137) Upon recognizing that the trouble sensor (114) has detected trouble, the context managing server 3101 transmits to the task managing server 3102, notification that a start condition for the trouble check task (priority level=high) registered at step S3106 has been met.

(Step S3138) Upon referring to task management information and confirming that any one is allowed to execute the task, the task managing server 3102 selects the user A as an executer of this task. Various methods of selecting a user are conceivable, which include, for example, selecting a user on patrol at a location closest to a trouble sensor 1 (114) of the building B among a list of users on patrol and their current positions; and selecting a user standing by at the control center. Such user selection may be performed by an application running on a different server. In such a case, the task managing server 3102 having received the transmission of the task start condition being met sends notification of user selection to the application, and the application selects a user, based on context information of the user acquired from the context managing server 3101, and sends a response indicating the user to the task managing server 3102. After selecting the user A, when the task managing server 3102 recognizes that the warehouse A patrol task (priority level=middle) is being executed at the terminal 102 of the user A and therefore, the warehouse A patrol task must be suspended before the start of the trouble check task, the task managing server 3102 requests the task controller executing unit 234 of the terminal 102 of the user A to suspend the patrol task.

(Step S3139) The task controller executing unit 234 makes a request to suspend the warehouse A patrol controller 3112.

(Step S3140) The warehouse A patrol controller 3112 sends back a response to the suspension request.

(Step S3141) The task controller executing unit 234 transmits to the task managing server 3102, notification that the warehouse A patrol task has been suspended.

(Step S3142) The task managing server 3102 transmits to the task controller executing unit 234 of the terminal 102 of the user A, a request to start the trouble check task.

(Step S3143) The task controller executing unit 234 accesses a specified URL and makes a request for downloading the trouble check controller.

(Step S3144) The trouble check controller 3113 is downloaded to the task controller executing unit 234 and is installed in the terminal 102.

(Step S3145) The task controller executing unit 234 starts the downloaded trouble check controller 3113.

(Step S3146) The started trouble check controller 3113 transmits to the task controller executing unit 234, notification of the completion of start of the trouble check controller 3113.

(Step S3147) The task controller executing unit 234 transmits to the task managing server 3102, notification of the completion of start of the task.

(Step S3148) The task managing server 3102 transmits the start of the task 3 to the context managing server 3101. The context managing server 3101 updates the state of the user A to "executing the task 3".

(Step S3149) The started trouble check controller 3113 displays a message "Trouble sensor 1 (114) has detected trouble. Check the presence/absence of trouble immediately.", the "trouble-detection" button, and the "no trouble" button, on the screen of the terminal 102 of the user A. Having confirmed the screen, the user A rushes to the place in the building B where the trouble sensor 1 (114) is installed, confirms that no trouble has actually occurred, and manipulates the "no trouble" button (the terminal 102 registers the user's position when the user A moves to the building B, but this process is not depicted in the sequence diagram.)

(Step S3150) Consequent to the "no trouble" button being manipulated, the trouble check controller 3113 transmits notification of the completion of the task to the task controller executing unit 234, and ends the process.

(Step S3151) The task controller executing unit 234 transmits notification of the completion of the task to the task managing server 3102.

(Step S3152) The task managing server 3102 transmits notification of the completion of the task 3 to the context managing server 3101. The context managing server 3101 updates the state of the user A to "idle", or may store at step S3148, the state "executing task 2" preceding the start of execution of the task 3 and bring the user A back to the state "executing task 2" (setting the state of the user A to "idle" causes no problem because the state of the user A returns to the "executing task 2" at step S3157 to follow.)

(Step S3153) Recognizing that the trouble check task (priority level=high) has been completed, the task managing server 3102 makes a request to resume the suspended warehouse A patrol task, which is the task highest in priority level next to the trouble check task.

(Step S3154) The task controller executing unit 234 restarts the suspended warehouse A patrol controller 3112.

(Step S3155) The restarted warehouse A patrol controller 3112 transmits notification of the completion of the restarting to the task controller executing unit 234.

(Step S3156) The controller executing unit 234 transmits to the task managing server 3102, notification of the completion of resumption of the task 2.

(Step S3157) The task managing server 3102 transmits notification of the resumption of the task 2 to the context managing server 3101, which updates the state of the user A to "executing task 2".

(Step S3158) When the warehouse A patrol controller 3112 is restarted and the screen thereof is displayed, the user A returns to the warehouse A to resume the patrol. In this manner, the screen of the warehouse A patrol controller 3112 is displayed on the terminal 102. This allows the user A to resume the suspended warehouse A patrol work without forgetting it. When finishing the patrol without problem, the user manipulates the "lighting-OFF" button (the terminal 102 registers the user's position when the user A returns to the warehouse A, but this process is not depicted in the sequence diagram).

(Step S3159) The warehouse A patrol controller 3112 makes a request to the lighting device 113 of the warehouse A searched at step S3122 to execute the lighting control service with a parameter OFF.

(Step S3160) The lighting device 113 of the warehouse A executes the service requested at step S3153 (e.g., turns off the lighting) and then sends back a response of service execution.

(Step S3161) The user A manipulates the "no trouble" button of the warehouse A patrol controller 3112 and ends the patrol of the warehouse A.

(Step S3162) Consequent to the "no trouble" button being manipulated, the warehouse A patrol controller 3112 transmits notification of the completion of the task to the task controller executing unit 234, and ends the process.

(Step S3163) The task controller executing unit 234 transmits notification of the completion of the task to the task managing server 3102.

(Step S3164) The task managing server 3102 transmits notification of the completion of the task 2 to the context managing server 3101. The context managing server 3101 updates the state of the user A to "idle".

The above task definition is described as an example, and task definition is not limited to the task dividing method as described above. For example, in the above example, starting patrolling the warehouse is defined as one task and is separated from the warehouse A patrol task, which is actual work to perform. However, both tasks may be integrated together and defined as a single task. In such a case, subtasks, such as warehouse A patrol and warehouse B patrol, are defined as tasks subordinate to the overall patrol task, and each task controller corresponding to each of these subtasks is defined. When a "warehouse A patrol start" button is manipulated, a controller necessary for executing a subtask corresponding to "warehouse A patrol" is started.

A task controller is downloaded each time the start has been requested. However, for example, a controller for a frequent task (e.g., trouble check controller 3113) may be installed in advance in the terminal 102. In the above example, when execution of a task is completed, the task controller corresponding to the task is left installed in the terminal 102. When the memory capacity of the terminal 102 is limited, however, the task controller may be uninstalled following the completion of the task to release the memory occupied by the task controller.

Figure 32:
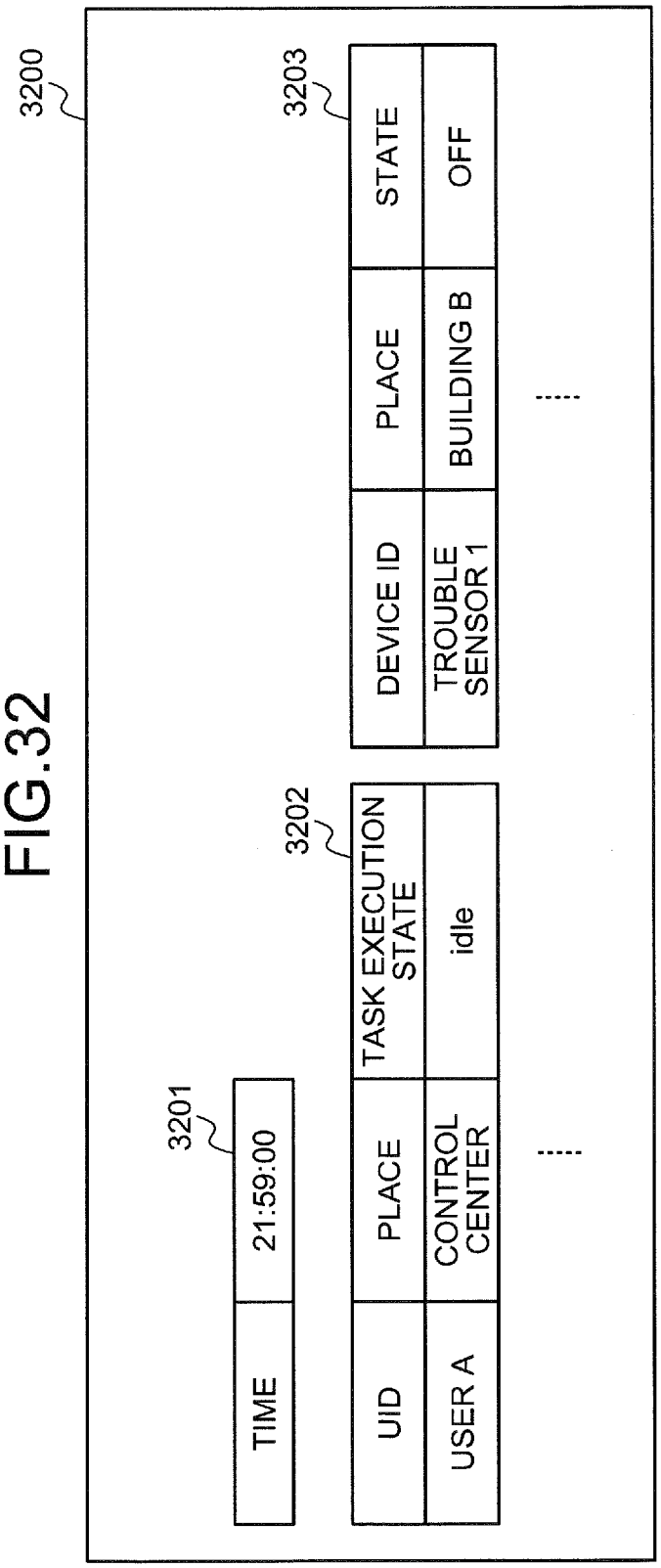
FIG. 32 is a table of an example of context information.

An example of management data used for the above security patrol will be described. FIG. 32 is a table of an example of context information. Context information 3200 under management by the context managing server 3101 is used to manage the state of each user and device. The context information 3200 includes information of time 3201, user context 3202, and device context 3203. Time 3201 represents current time information used in common in the system. User context 3202 represents state information of each user, and is information for managing the location of the user and the execution state of a task. Device context 3203 represents state information of each device, and is information for managing the place of installation of the device (building B) and the state of the device (ON/OFF state of the trouble sensor 1 (114)).

Figure 33:
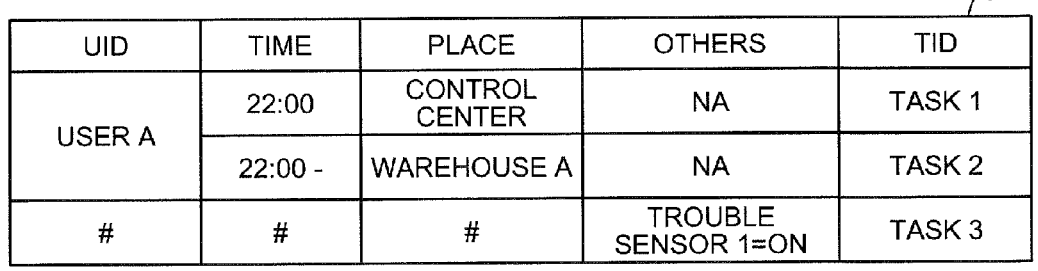
FIG. 33 is a table of an example of task management information.

FIG. 33 is a table of an example of task management information. The context managing server 3101 manages tasks using task management information 3300. The task management information 3300 is information for managing start conditions for tasks to be executed by individual users, and includes information of UID, time, place, others, and TID. UID represents information of the ID of a user who is to execute a task, time represents information of a time condition under which a task is to be executed, place represents information of a place condition under which a task is to be executed, others represent information of a condition other than the above conditions, under which condition a task is to be executed, and TID represent information of the ID of a task that is to be executed when the above conditions are met.

When the state of the user or device changes, the context managing server 3101 searches the task managing information 3300 corresponding to the user or device and determines the presence/absence of a task for execution. To perform this determination process faster, additional data may be managed. For example, flag information indicating for each user whether the user has a task to execute (task not executed yet) may be managed as context managing data. In this case, for a user having no tasks to execute, the process of determining the presence/absence of a task for execution is not performed even if context changes.

FIG. 34 is a table of an example of task management information. The task managing unit 202 of the task managing server 3102 manages tasks using task management information 3400. The task management information 3400 is task management information concerning tasks to be executed by individual users, and includes information of UID, TID, time, place, priority level, and state. UID represents information of the ID of a user who is to execute a task, TID represents the ID of a task for execution, time represents information of a time to execute a task, place represents information of a place where a task is to be executed, priority represents the priority of a task, and state represents the execution state of a task (not executed/under execution/completed).

In FIG. 34, "#" entry in the UID item indicates that the task 3 is not defined as a task to be executed by a specific user. A user who is to execute such a task is determined dynamically depending on situations.

FIG. 35 is a table of an example of task controller management information. Task controller management information 3500 is information concerning task controllers necessary for executing tasks, and is under management by the service managing unit 203 of the task managing server 3102. The task controller management information 3500 includes information of TID and controller URL. TID represents a task ID, and controller URL represents information of a URL indicating the storage place of a controller necessary for executing a task.

FIG. 36 is a table of an example of task/service corresponding information. Task/service corresponding information 3600 is information concerning devices and services necessary for executing individual task, and is under management by the service managing unit 203 of the task managing server 3102. The task/service corresponding information 3600 includes information of TID, device, and service. TID represents a task ID, device represents a device name, and service represents a service name. NA (Not Applicable) entered in the table of FIG. 36 indicates that no device and service is necessary for executing a task.

Figure 37:
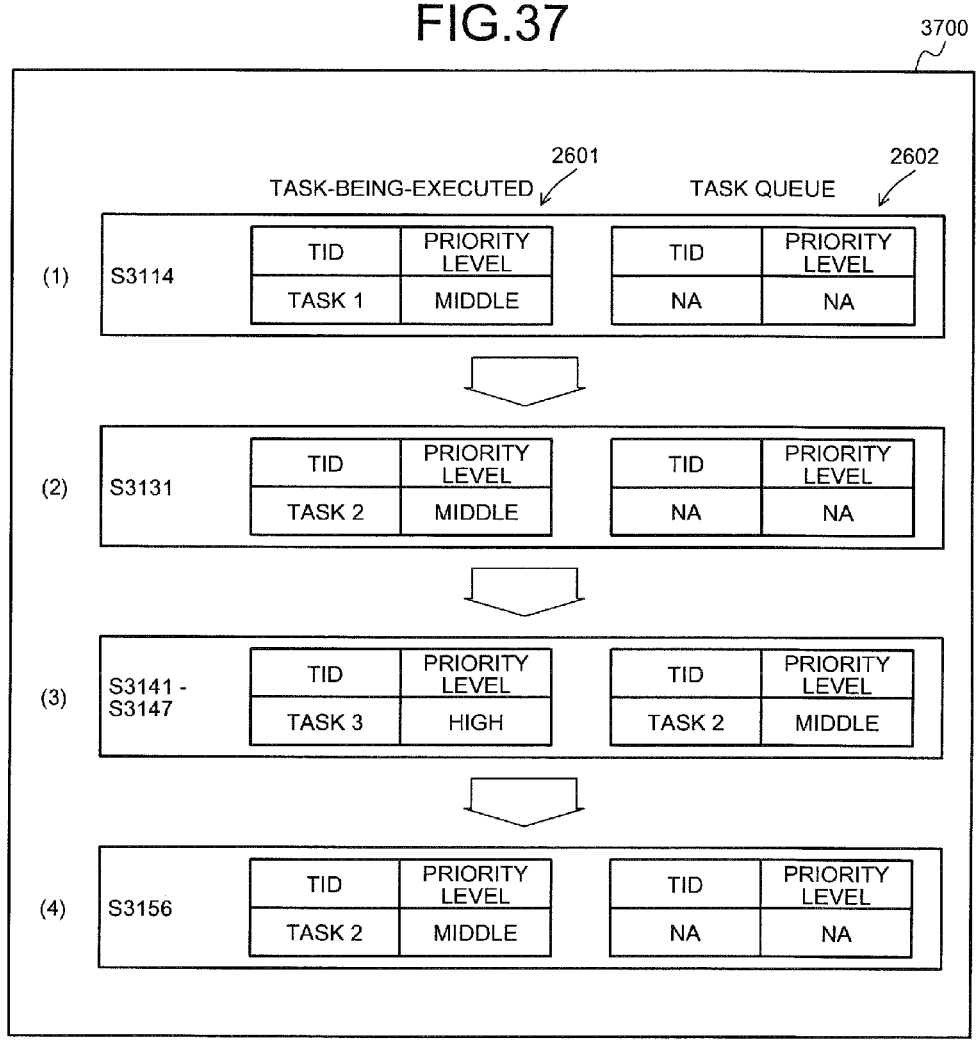
FIG. 37 is a table of task execution management information under management by the task scheduler.

FIG. 37 is a table of task execution management information under management by the task scheduler. The task scheduler 214a manages information concerning task execution control for each user, as task execution management information 3700. The task execution management information 3700 includes task under execution 2601 and task queue 2602, each of which is information concerning the user A for managing TID and priority level. The task under execution 2601 is information concerning a task under execution, in which TID represents information of the ID of the task and priority level represents the priority level of the task. The task queue 2602 is information concerning a task standing by for execution, in which TID represents information of the ID of the task and priority level represents the priority level of the task. In the example of FIG. 37, zero or one task is entered in the task queue 2602. However, when task suspension occurs several times, two or more tasks may be entered in the task queue 2602.

A change in the contents of the task execution management information 3700 will be described along the procedures of sequence diagrams of FIGS. 31A to 31D. Steps S3111 to S3117: A task under execution or a task standing by for execution is not present (not depicted). (1) Step S3114: Because the start of the task 1 has been completed, information concerning the task 1 is stored as the task under execution 2601. Because no task standing by for execution is present, the task queue 2602 has no information (which is indicated as NA).

Step S3118: When the task 1 is completed, information concerning the task 1 is deleted from the task under execution 2601. As a result, no task under execution or task standing by for execution is present (not depicted). (2) Step S3131: Because the start of the task 2 has been completed, information concerning the task 2 is stored as the task under execution 2601. Because no task standing by for execution is present, the task queue 2602 has no information.

(3) Steps S3141 to S3147: When execution of the task 3 (priority level=high) is requested, a process of suspending the task 2 being executed (priority level=middle) is performed. When the suspension process is completed at step S3141, information concerning the task 2 is entered in the task queue 2602. Subsequently, when the start of the task 3 is completed at step S3147, information concerning the task 3 is stored as the task under execution 2601.

(4) Step S3156: When the task 3 is completed at step S3151, information of the task 3 is deleted from the task under execution 2601 (not depicted). When execution of the task 2 is resumed at step S3156, information concerning the task 2 is stored as the task under execution 2601.

Step S3163: When execution of the task 2 is completed, information of the task 2 is deleted from the task under execution 2601. As a result, no task under execution or task standing by for execution is present (not depicted).

A flag (not depicted in FIG. 37) indicative of whether the terminal 102 is suspended is provided for each terminal 102. When suspension of the terminal 102 is requested, the terminal 102 sets the flag so that task control over the terminal 102 is suspended during a period in which the flag is kept raised. If notification that a start condition for a task has been met is issued during that period, information concerning the task is entered in the task queue 2602, regardless of the priority level of the task.

According to the above second embodiment, based on context of the user and the user's surrounding environment and on a service provided by the peripheral device, multiple tasks can be executed in order while priority orders and the dependency relation between tasks are taken into consideration in the same manner as in the first embodiment. In addition, according to the second embodiment, when a different task interrupts during execution of a task, suspension and resumption of execution of the task can be controlled based on the priority levels of both tasks. This allows efficient processing of multiple tasks. According to the second embodiment, task control corresponding to the movement of the user is performed. This allows the user to receive a necessary service at each destination while continuing to change positions.

According to the task execution controller, the task execution control system, and the task execution control method disclosed herein, an effect is achieved such that a task desired by a user can be executed efficiently according to the situation of the user.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A task execution controller comprising:
a memory configured to store multiple tasks a user attempts to execute; and
a hardware processor configured to
generate context information concerning the user and a surrounding situation of the user including place information where the user stays;

store a control command for receiving the context information at a given timing coinciding with execution of the task;
select a task according to the context information and a predetermined task selection rule;
control execution of the task;
confirm available services of a device near the use for execution of the task;
give notification of a service corresponding to the execution of the selected to the device near the user; and
cause the device near the user to perform the service,
wherein the hardware processor selects a task by using, as the task selection rule, information of priority levels of tasks and an execution-related dependency relation between tasks preset among the tasks; and
wherein the hardware processor includes a task scheduler that refers to the context information and the task selection rule, and performs execution scheduling and suspension control on the tasks.

2. The task execution controller according to claim 1, wherein the hardware processor is further configured to
store multiple tasks to be executed by the user;
store the task selection rule; and
select based on the context information and the task selection rule, a task to be executed with highest priority among the stored multiple tasks.

3. The task execution controller according to claim 1, wherein the hardware processor is further configured to:
store, temporarily, a service executed by the device;
confirm services currently available to the device;
store a correspondence relation between the task and the service; and
check whether the selected task can be executed by the device based on a service among stored services and confirmed to be currently available.

4. The task execution controller according to claim 3, wherein the hardware processor, based on notification that is from the device and indicates that the device has found a service that can be executed by another device that is nearby, stores information of the service into an available service cache.

5. The task execution controller according to claim 3, wherein the hardware processor is further configured to store definitions of the device and a service that can be executed by the device, and is referred to for a service that can be executed by the other device found by the device.

6. The task execution controller according to claim 1, wherein the hardware processor is further configured to:
store a task controller which is software that controls the device for executing the task; and
transmit to the device, a task-executing task controller corresponding to the selected task.

7. The task execution controller according to claim 1, further comprising:
a sensor/terminal information aggregating unit configured to aggregate information of the service and of a measuring sensor incorporated in the device, and transmit the aggregated information as information used for the context information.

8. The task execution controller according to claim 1, wherein the task scheduler requests confirmation of an execution condition being met for a task that meets the execution condition and has not been executed because a service for executing the task has not been found, further requests for determination of executability/non-executability of the task, makes the requests periodically, in descending order of priority level, and further awaits task execution in descending order of priority level.

9. The task execution controller according to claim 1, wherein the task scheduler, when a task is not present for which an execution condition is met, resets an execution condition for the task and puts the task in an executable state based on the context information and confirmation of a current execution condition for the task.

10. The task execution controller according to claim 1, wherein the task scheduler, when receiving a request for suspending the device near the user, from a terminal, suspends task start, suspension, and resumption control on the device near the user.

11. A task execution control system comprising:
a server; and
a device,
wherein the server includes a first hardware processor configured to:
generate context information concerning a user and a surrounding situation of the user including place information where the user stays;
store multiple tasks the user attempts to execute,
store a control command for receiving the context information at a given timing coinciding with execution of each of the multiple tasks;
select a task according to the context information and a predetermined task selection rule and control execution of the task;
confirm available services of a device near the user for execution of the task;
give notification of a service corresponding to the execution of the selected task, to the device near the user; and
cause the device near the user to perform the service,
the first hardware processor selects a task using, as the task selection rule, information of priority levels of tasks and an execution-related dependency relation between tasks preset among the tasks, wherein the first hardware processor includes a task scheduler that refers to the context information and the task selection rule, and performs execution scheduling and suspension control on the tasks, and
the device near the user has a second hardware processor configured to:
search a service of the device near the user and a service of another device present near the device near the user notifies the server of information of the services, and
control the service by the device near the user according to a program or a command from the server.

12. The task execution control system according to claim 11, wherein the device includes:
a terminal that exchanges information with the server, and
a peripheral device that executes the service via the terminal, the peripheral device includes:
a responding/advertising unit that transmits presence of the peripheral device and device information of the peripheral device to the terminal, and
a controlled unit that executes the service according to control information from the terminal, and
the peripheral device that corresponds to the service is used based on the context information.

13. A task execution control method comprising:
generating, by a hardware processor, context information concerning a user and a surrounding situation of the user including place information where the user stays;

storing, by a memory, multiple tasks the user attempts to execute;

store a control command for receiving the context information at a given timing coinciding with execution of each of the multiple tasks;

selecting, by the hardware processor, a task according to the context information and a predetermined task selection rule;

controlling, by the hardware processor, execution of the task;

confirming, by the hardware processor, available services of a device near the user for execution of the task;

giving, by the hardware processor, notification of a service corresponding to the execution of the selected task, to the device near the user; and causing, by the hardware processor, the device near the user to perform the service, wherein the selecting includes selecting a task by using, as the task selection rule, information of priority levels of tasks and an execution-related dependency relation between tasks preset among the tasks; and wherein the hardware processor includes a task scheduler that refers to the context information and the task selection rule, and performs execution scheduling and suspension control on the tasks.

* * * * *